United States Patent
Leibkowiz et al.

(10) Patent No.: US 11,296,922 B2
(45) Date of Patent: Apr. 5, 2022

(54) CONTEXT-AWARE AUTOMATED ROOT CAUSE ANALYSIS IN MANAGED NETWORKS

(71) Applicant: ServiceNow, Inc., Santa Clara, CA (US)

(72) Inventors: Yair Leibkowiz, Lod (IL); Yuval Rimar, Petach Tikva (IL); Rani Tzur, Tzur Yigal (IL); Maayan Wigelman, Kfar Saba (IL); Dov Miron, Petah Tikva (IL); Bnayahu Makovsky, Savyon (IL)

(73) Assignee: ServiceNow, Inc., Santa Clara, CA (US)

( * ) Notice: Subject to any disclaimer, the term of this patent is extended or adjusted under 35 U.S.C. 154(b) by 146 days.

(21) Appl. No.: 16/845,269

(22) Filed: Apr. 10, 2020

(65) Prior Publication Data
US 2021/0320836 A1 Oct. 14, 2021

(51) Int. Cl.
*H04L 41/0631* (2022.01)
*G06F 9/54* (2006.01)
(Continued)

(52) U.S. Cl.
CPC .......... *H04L 41/0631* (2013.01); *G06F 9/542* (2013.01); *G06F 16/2358* (2019.01); *H04L 41/069* (2013.01)

(58) Field of Classification Search
CPC ............... H04L 41/0631; H04L 41/069; G06F 16/2358; G06F 9/542
See application file for complete search history.

(56) References Cited

U.S. PATENT DOCUMENTS

| 4,941,084 A | 7/1990 | Terada et al. |
| 5,185,860 A | 2/1993 | Wu |

(Continued)

FOREIGN PATENT DOCUMENTS

| EP | 0433979 | 6/1991 |
| EP | 1607824 | 12/2005 |

(Continued)

OTHER PUBLICATIONS

"Geneva ServiceNow IT Operations Management," servicenow, Dec. 5, 2017.

*Primary Examiner* — Walter J Divito
*Assistant Examiner* — Anthony Luo
(74) *Attorney, Agent, or Firm* — McDonnell Boehnen Hulbert & Berghoff LLP

(57) ABSTRACT

Configuration management persistent storage contains entries representing configuration items and relationships between pairs of the configuration items. Event management persistent storage contains entries representing alert records. Change request persistent storage contains change records respectively referring to changes made to the configuration items. One or more processors may be configured to: extract, from a particular alert, a particular configuration item referred to therein that is associated with a particular problem; determine, by way of the relationships, a set of configuration items within a topological distance of the particular configuration item; identify, by way of the change records, one or more change requests that refer to any of the set of configuration items; and calculate root cause scores for the one or more change requests, wherein the root cause scores respectively represent estimations of impacts that the changes of the one or more change requests had on causing the particular alert.

20 Claims, 12 Drawing Sheets

(51) Int. Cl.
    *G06F 16/23*       (2019.01)
    *H04L 41/069*      (2022.01)

(56)            References Cited

U.S. PATENT DOCUMENTS

| | | | |
|---|---|---|---|
| 5,237,518 | A | 8/1993 | Sztipanovits et al. |
| 5,261,097 | A | 11/1993 | Saxon |
| 5,265,252 | A | 11/1993 | Rawson, III et al. |
| 5,367,685 | A | 11/1994 | Gosling |
| 5,390,297 | A | 2/1995 | Barber et al. |
| 5,442,791 | A | 8/1995 | Wrabetz et al. |
| 5,452,415 | A | 9/1995 | Hotka |
| 5,522,042 | A | 5/1996 | Fee et al. |
| 5,533,116 | A | 7/1996 | Vesterinen |
| 5,655,081 | A | 8/1997 | Bonnell et al. |
| 5,659,736 | A | 8/1997 | Hasegawa et al. |
| 5,671,412 | A | 9/1997 | Christiano |
| 5,696,701 | A | 12/1997 | Burgess et al. |
| 5,715,463 | A | 2/1998 | Merkin |
| 5,745,879 | A | 4/1998 | Wyman |
| 5,761,502 | A | 6/1998 | Jacobs |
| 5,764,913 | A | 6/1998 | Jancke et al. |
| 5,887,139 | A | 3/1999 | Madison, Jr. et al. |
| 5,909,217 | A | 6/1999 | Bereiter |
| 5,937,165 | A | 8/1999 | Schwaller et al. |
| 5,949,976 | A | 9/1999 | Chappelle |
| 5,978,594 | A | 11/1999 | Bonnell et al. |
| 6,021,437 | A | 2/2000 | Chen et al. |
| 6,041,347 | A | 3/2000 | Harsham et al. |
| 6,088,717 | A | 7/2000 | Reed et al. |
| 6,101,500 | A | 8/2000 | Lau |
| 6,128,016 | A | 10/2000 | Coelho et al. |
| 6,131,118 | A | 10/2000 | Stupek, Jr. et al. |
| 6,134,581 | A | 10/2000 | Ismael et al. |
| 6,138,122 | A | 10/2000 | Smith et al. |
| 6,148,335 | A | 11/2000 | Haggard et al. |
| 6,166,732 | A | 12/2000 | Mitchell et al. |
| 6,167,448 | A | 12/2000 | Hemphill et al. |
| 6,175,866 | B1 | 1/2001 | Holloway et al. |
| 6,175,878 | B1 | 1/2001 | Seaman et al. |
| 6,260,050 | B1 | 7/2001 | Yost et al. |
| 6,263,457 | B1 | 7/2001 | Anderson et al. |
| 6,272,150 | B1 | 8/2001 | Hrastar et al. |
| 6,336,138 | B1 | 1/2002 | Caswell et al. |
| 6,363,421 | B2 | 3/2002 | Barker et al. |
| 6,393,386 | B1 | 5/2002 | Zager et al. |
| 6,397,245 | B1 | 5/2002 | Johnson, II et al. |
| 6,434,626 | B1 | 8/2002 | Prakash et al. |
| 6,438,592 | B1 | 8/2002 | Killian |
| 6,456,306 | B1 | 9/2002 | Chin et al. |
| 6,466,932 | B1 | 10/2002 | Dennis et al. |
| 6,487,590 | B1 | 11/2002 | Foley et al. |
| 6,505,248 | B1 | 1/2003 | Casper et al. |
| 6,526,442 | B1 | 2/2003 | Stupek, Jr. et al. |
| 6,621,823 | B1 | 9/2003 | Mellquist et al. |
| 6,707,795 | B1 | 3/2004 | Noorhosseini et al. |
| 6,742,015 | B1 | 5/2004 | Bowman-Amuah |
| 6,763,380 | B1 | 7/2004 | Mayton et al. |
| 6,816,898 | B1 | 11/2004 | Scarpelli et al. |
| 6,895,586 | B1 | 5/2005 | Brasher et al. |
| 6,948,175 | B1 | 9/2005 | Fong et al. |
| 6,985,901 | B1 | 1/2006 | Sachse et al. |
| 7,003,564 | B2 | 2/2006 | Greuel et al. |
| 7,028,228 | B1 | 4/2006 | Lovy et al. |
| 7,043,537 | B1 | 5/2006 | Pratt |
| 7,043,661 | B2 | 5/2006 | Valadarsky et al. |
| 7,062,683 | B2 | 6/2006 | Warpenburg et al. |
| 7,096,459 | B2 | 8/2006 | Keller et al. |
| 7,146,574 | B2 | 12/2006 | Goldthwaite et al. |
| 7,197,466 | B1 | 3/2007 | Peterson et al. |
| 7,215,360 | B2 | 5/2007 | Gupta |
| 7,216,304 | B1 | 5/2007 | Gourdol et al. |
| 7,222,147 | B1 | 5/2007 | Black et al. |
| 7,281,170 | B2 | 10/2007 | Taylor et al. |
| 7,412,502 | B2 | 8/2008 | Fearn et al. |
| 7,505,872 | B2 | 3/2009 | Keller et al. |
| 7,593,013 | B2 | 9/2009 | Agutter et al. |
| 7,596,716 | B2 | 9/2009 | Frost et al. |
| 7,617,073 | B2 | 11/2009 | Trinon et al. |
| 7,660,731 | B2 | 2/2010 | Chaddha et al. |
| 7,676,294 | B2 | 3/2010 | Baier et al. |
| 7,676,437 | B2 | 3/2010 | Satkunanathan et al. |
| 7,840,490 | B1 | 11/2010 | Sellers et al. |
| 7,877,783 | B1 | 1/2011 | Cline et al. |
| 7,890,869 | B1 | 2/2011 | Mayer et al. |
| 7,966,398 | B2 | 6/2011 | Wiles, Jr. |
| 8,060,396 | B1 | 11/2011 | Bessler et al. |
| 8,196,210 | B2 | 6/2012 | Sterin |
| 8,321,948 | B2 | 11/2012 | Robinson et al. |
| 8,407,669 | B2 | 3/2013 | Yee et al. |
| 8,554,750 | B2 | 10/2013 | Rangarajan et al. |
| 8,595,647 | B2 | 11/2013 | Sabin et al. |
| 8,620,818 | B2 | 12/2013 | Hughes et al. |
| 8,646,093 | B2 | 2/2014 | Myers et al. |
| 8,674,992 | B2 | 3/2014 | Poston et al. |
| 8,725,647 | B2 | 5/2014 | Disciascio et al. |
| 10,601,640 | B1* | 3/2020 | Das ............. H04L 41/147 |
| 10,986,131 | B1* | 4/2021 | Kruse ............. H04L 63/10 |
| 2002/0116340 | A1 | 8/2002 | Hellberg et al. |
| 2002/0133584 | A1 | 9/2002 | Greuel et al. |
| 2002/0158969 | A1 | 10/2002 | Gupta |
| 2003/0118087 | A1 | 6/2003 | Goldthwaite et al. |
| 2003/0200293 | A1 | 10/2003 | Fearn et al. |
| 2005/0015217 | A1 | 1/2005 | Weidl et al. |
| 2005/0091356 | A1 | 4/2005 | Izzo |
| 2006/0026453 | A1 | 2/2006 | Frost et al. |
| 2006/0095461 | A1 | 5/2006 | Raymond |
| 2006/0179058 | A1 | 8/2006 | Bram et al. |
| 2006/0293942 | A1 | 12/2006 | Chaddha et al. |
| 2007/0033279 | A1 | 2/2007 | Battat et al. |
| 2007/0188494 | A1 | 8/2007 | Agutter et al. |
| 2007/0288389 | A1 | 12/2007 | Vaughan et al. |
| 2008/0133289 | A1 | 6/2008 | Armour et al. |
| 2008/0148253 | A1 | 6/2008 | Badwe et al. |
| 2008/0319779 | A1 | 12/2008 | Hughes et al. |
| 2009/0088875 | A1 | 4/2009 | Baier et al. |
| 2009/0228984 | A1 | 9/2009 | Sterin |
| 2010/0110932 | A1 | 5/2010 | Doran et al. |
| 2011/0264282 | A1* | 10/2011 | Blank ............. G06Q 50/06 700/282 |
| 2015/0262114 | A1* | 9/2015 | Ming ............. G06Q 10/063114 705/7.15 |
| 2018/0321935 | A1* | 11/2018 | Bansal ............. G06F 8/70 |
| 2020/0059407 | A1* | 2/2020 | Lu ............. H04L 41/0896 |
| 2021/0067962 | A1* | 3/2021 | Fromentoux ............. H04L 63/08 |

FOREIGN PATENT DOCUMENTS

| | | |
|---|---|---|
| WO | WO 99/34285 | 7/1999 |
| WO | WO 00/52559 | 9/2000 |
| WO | WO 01/79970 | 10/2001 |

* cited by examiner

700

| Change Request CHG0030026 | | Follow ▼ | Request Approval | Update | Delete | ↑ |

| | | | | |
|---:|:---|:---|---:|:---|
| Number | CHG0030026 ← 702 | | Type | Emergency ▼ |
| Requested by | System Administrator 🔍 | | State | Open ▼ |
| Category | Other ▼ | | Conflict Status | Not Run |
| Service | 🔍 | | Conflict Last Run | |
| Configuration item | ABC-123 🔍 ← 704 | | Assignment group | OS Support Group 🔍 |
| Priority | 1 - Critical ▼ | | Assigned to | John Doe 🔍 |
| Risk | Moderate ▼ | | Date completed | 🔍 |
| Impact | 3 - Low ▼ | | | 706 |

Short description: !!! Critical !!! Vulnerabilites with known exploits: CVE-2014-6271

Description: A vulnerability group VUL0004580 with security vulnerabilities in your environment requires remediation. Please refer to the Planning tab in this change request for more information

| Planning | Schedule | Conflicts | Notes | Closure information |

Justification: This change is required to address 8 vulnerabilities across 9 CIs with a risk rating up to '1 – Critical'. The remediation target date is 2019-10-10.

Implementation plan:
Solution: VS0003597
Source: Microdyne
Requires restart: MAYBE
Summary: July 9, 2019 – KB4506991 Cumulative Update for .NET Framework 3.5 and 4.8 for OS 10, version 1903
Bulletin: July 2019 Security Updates
Description: See Links for additional information.
Links:
https://support.microdyne.com/help/4506991
https://catalog.update.microdyne.com/v7/site/Search.aspx?q=KB4506991

FIG. 7

| | | |
|---|---|---|
| NUMBER | INC0000456 | ← 802 |
| ORIGINATOR | BOB SMITH | |
| CREATED | 2020-02-07 9:56AM | ← 804 |
| SHORT DESCRIPTION | CAN'T CONNECT TO EMAIL | |
| DESCRIPTION | MY EMAIL CLIENT IS NOT DOWNLOADING NEW EMAILS. I AM CONNECTED TO THE WIRELESS NETWORK AND CAN ACCESS THE INTERNET, BUT MY CLIENT KEEPS REPORTING THAT IT IS UNABLE TO ACCESS THE SERVER. | |
| CATEGORY | EMAIL | |
| ASSIGNED TO | ALICE JONES | |
| STATUS | RESOLVED | |
| RESOLUTION | BOB'S LAPTOP WAS CONNECTED TO THE "GUEST" WIRELESS NETWORK, WHICH IS OUTSIDE OF THE FIREWALL. I TOLD HIM THAT HE COULD EITHER USE THE VPN TO ACCESS HIS EMAIL, OR CONNECT TO THE "EMPLOYEE" WIRELESS NETWORK, WHICH REQUIRES THE PASSWORD BUT IS INSIDE THE FIREWALL. | |
| RESOLVED TIME | 2020-02-07 10:10AM | |
| CLOSURE CODE | SOLVED (PERMANENTLY) | |
| NOTES | THIS IS THE THIRD TIME IN A WEEK THAT I'VE HAD TO ADDRESS A SIMILAR ISSUE. CAN WE POST WIRELESS NETWORKING INSTRUCTIONS IN ALL CONFERENCE ROOMS? | |
| LINK TO KNOWLEDGEBASE | ITKB/WIRELESS/CONFIGURATION.HTML | |
| CONFIGURATION ITEM | ABC-123 | ← 806 |

FIG. 8

1000 Alert0020561

Cannot connect to database 1002

| Priority group: | Severity: | State: | Configuration Item: | Category: |
|---|---|---|---|---|
| Urgent | 1-Critical | Open 1004 | Web Server 602 | Default |

| Overview | Probable Root Cause (3) | Impacted Services |
|---|---|---|

Probable Root Cause 1006

| Number | Configuration Item | Description 1008 | Reasoning | Parent Alert | Date/Time |
|---|---|---|---|---|---|
| CHG0030006 | Database 604 | Upgrade MySQL s/w | Change on CI | Alert0020561 | 2020-03-20 |
| CHG0030002 | Web Server 602 | Install security patch ← 1010 | Change on CI | Alert0020561 | 2020-03-19 |
| Alert0020571 | Server Device 606 | High CPU utilization ← 1012 | Alert on rltd CI | Alert0020561 | 2020-03-19 |

Actions 1014

- Create Incident 1016
- CMDB Group Visualization 1018
- Dependency View 1020
- Search 1022

FIG. 10

CONTEXT-AWARE AUTOMATED ROOT CAUSE ANALYSIS IN MANAGED NETWORKS

BACKGROUND

When a managed network, such as an enterprise network, exhibits problems, it can be remarkably challenging to determine the source of these problems, much less mitigate or resolve the problems. Root cause analysis involves a suite of techniques that seek to locate, or at least narrow down the location, of such problems. But in a managed network of thousands of devices each operating multiple software applications to provide dozens of services, performing accurate root cause analysis can be difficult and problematic in practice. As a result, the mean time to resolution (MTTR) of problems can be longer than desired.

SUMMARY

Modern enterprise networks, and other types of networks, are often actively managed. One aspect of this management the ability for a discovery software resident on the managed network or remotely connected to the managed network to automatically determine the physical and logical topology of the managed network's devices. The discovery software may also be able to automatically catalog the software operating on the devices, as well as the service relationships between this software. To that point, records of each of these hardware and software units, as well as the relationships therebetween, can be stored in a database. By exploring these relationships, maps of the hardware topologies and the software services can be determined.

These devices and/or software programs may be configured to transmit alert messages to a centralized location (e.g., a database) when they detect a problem. Such information can be helpful, but not determinative, when attempting to automatically ascertain the root cause of a problem. For example, an alert that a device has abnormally high processor utilization does not in itself provide any indication of why this is the case.

But managed networks may also have access to further information about this infrastructure in other databases. Particularly, a change request database may contain records of changes made to the devices and software. Such changes are often the root cause of problems or related to such root causes. Further, an incident database may contain records of issues raised by technology users. These incidents may also be related to or helpful in determining the root cause of a problem. Other types of databases may be similarly informative.

The embodiments herein make use of one of more of these databases to provide information that may be relevant to determining the root cause of a specific problem. This information can take various forms, such as a list of the devices, software, alerts, or incidents likely to be related to the root cause. As a consequence, less time is spent performing root cause analysis and the MTTR of problems for the managed network may decrease.

Accordingly, a first example embodiment may involve a configuration management persistent storage containing entries representing configuration items and relationships between pairs of the configuration items, wherein the configuration items specify units of computing hardware deployed on a managed network and units of software hosted by the units of computing hardware. The first example embodiment may also include an event management persistent storage containing entries representing alert records, wherein the alert records respectively refer to problems detected on the configuration items. The first example embodiment may also include a change request persistent storage containing change records, wherein the change records respectively refer to changes made to the configuration items. The first example embodiment may also include one or more processors configured to: (i) extract, from a particular alert of the alert records, a particular configuration item referred to therein that is associated with a particular problem; (ii) determine, by way of the relationships, a set of configuration items within a pre-determined topological distance from the particular configuration item; (iii) identify, by way of the change records, one or more change requests that refer to any of the set of configuration items; (iv) calculate root cause scores for the one or more change requests, wherein the root cause scores respectively represent estimations of impacts that the changes of the one or more change requests had on causing the particular alert; and (v) provide the root cause scores in decreasing order of the estimations of impacts.

A second example embodiment may involve extracting, from a particular alert, a particular configuration item referred to therein that is associated with a particular problem, wherein the particular alert is from an event management persistent storage that contains entries representing alert records, and wherein the alert records respectively refer to problems detected on the configuration items. The second example embodiment may also involve determining, by way of relationships between pairs of configuration items, a set of configuration items within a pre-determined topological distance from the particular configuration item, wherein a configuration management persistent storage contains entries representing the configuration items and the relationships between pairs of the configuration items, and wherein the configuration items specify units of computing hardware deployed on a managed network and units of software hosted by the units of computing hardware. The second example embodiment may also involve identifying, by way of change records, one or more change requests that refer to any of the set of configuration items, wherein a change request persistent storage contains the change records, wherein the change records respectively refer to changes made to the configuration items. The second example embodiment may also involve calculating root cause scores for the one or more change requests, wherein the root cause scores respectively represent estimations of impacts that the changes of the one or more change requests had on causing the particular alert. The second example embodiment may also involve providing the root cause scores in decreasing order of the estimations of impacts.

In a third example embodiment, an article of manufacture may include a non-transitory computer-readable medium, having stored thereon program instructions that, upon execution by a computing system, cause the computing system to perform operations in accordance with the first and/or second example embodiment.

In a fourth example embodiment, a computing system may include at least one processor, as well as memory and program instructions. The program instructions may be stored in the memory, and upon execution by the at least one processor, cause the computing system to perform operations in accordance with the first and/or second example embodiment.

In a fifth example embodiment, a system may include various means for carrying out each of the operations of the first and/or second example embodiment.

These, as well as other embodiments, aspects, advantages, and alternatives, will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

BRIEF DESCRIPTION OF THE DRAWINGS

FIG. 7 depicts a change request, in accordance with example embodiments.

FIG. 8 depicts an incident report, in accordance with example embodiments.

FIG. 10 depicts a graphical user interface, in accordance with example embodiments.

DETAILED DESCRIPTION

Figure 1:
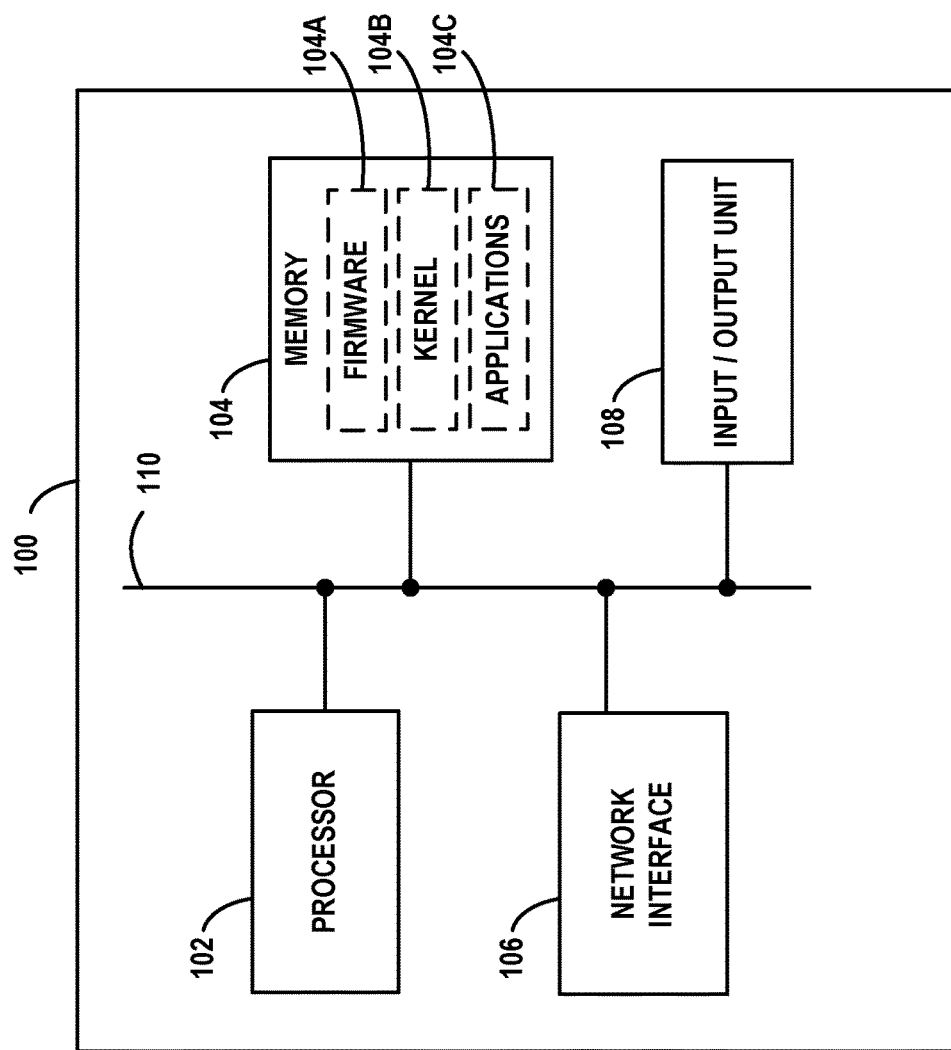
FIG. 1 illustrates a schematic drawing of a computing device, in accordance with example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations. For example, the separation of features into "client" and "server" components may occur in a number of ways.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. INTRODUCTION

A large enterprise is a complex entity with many interrelated operations. Some of these are found across the enterprise, such as human resources (HR), supply chain, information technology (IT), and finance. However, each enterprise also has its own unique operations that provide essential capabilities and/or create competitive advantages.

To support widely-implemented operations, enterprises typically use off-the-shelf software applications, such as customer relationship management (CRM) and human capital management (HCM) packages. However, they may also need custom software applications to meet their own unique requirements. A large enterprise often has dozens or hundreds of these custom software applications. Nonetheless, the advantages provided by the embodiments herein are not limited to large enterprises and may be applicable to an enterprise, or any other type of organization, of any size.

Many such software applications are developed by individual departments within the enterprise. These range from simple spreadsheets to custom-built software tools and databases. But the proliferation of siloed custom software applications has numerous disadvantages. It negatively impacts an enterprise's ability to run and grow its operations, innovate, and meet regulatory requirements. The enterprise may find it difficult to integrate, streamline, and enhance its operations due to lack of a single system that unifies its subsystems and data.

To efficiently create custom applications, enterprises would benefit from a remotely-hosted application platform that eliminates unnecessary development complexity. The goal of such a platform would be to reduce time-consuming, repetitive application development tasks so that software engineers and individuals in other roles can focus on developing unique, high-value features.

In order to achieve this goal, the concept of Application Platform as a Service (aPaaS) is introduced, to intelligently automate workflows throughout the enterprise. An aPaaS system is hosted remotely from the enterprise, but may access data, applications, and services within the enterprise by way of secure connections. Such an aPaaS system may have a number of advantageous capabilities and characteristics. These advantages and characteristics may be able to improve the enterprise's operations and workflows for IT, HR, CRM, customer service, application development, and security.

The aPaaS system may support development and execution of model-view-controller (MVC) applications. MVC applications divide their functionality into three interconnected parts (model, view, and controller) in order to isolate representations of information from the manner in which the information is presented to the user, thereby allowing for efficient code reuse and parallel development. These applications may be web-based, and offer create, read, update, delete (CRUD) capabilities. This allows new applications to be built on a common application infrastructure.

The aPaaS system may support standardized application components, such as a standardized set of widgets for graphical user interface (GUI) development. In this way, applications built using the aPaaS system have a common look and feel. Other software components and modules may be standardized as well. In some cases, this look and feel can be branded or skinned with an enterprise's custom logos and/or color schemes.

The aPaaS system may support the ability to configure the behavior of applications using metadata. This allows application behaviors to be rapidly adapted to meet specific needs. Such an approach reduces development time and increases flexibility. Further, the aPaaS system may support GUI tools that facilitate metadata creation and management, thus reducing errors in the metadata.

The aPaaS system may support clearly-defined interfaces between applications, so that software developers can avoid unwanted inter-application dependencies. Thus, the aPaaS system may implement a service layer in which persistent state information and other data are stored.

The aPaaS system may support a rich set of integration features so that the applications thereon can interact with legacy applications and third-party applications. For instance, the aPaaS system may support a custom employee-onboarding system that integrates with legacy HR, IT, and accounting systems.

The aPaaS system may support enterprise-grade security. Furthermore, since the aPaaS system may be remotely hosted, it should also utilize security procedures when it interacts with systems in the enterprise or third-party networks and services hosted outside of the enterprise. For example, the aPaaS system may be configured to share data amongst the enterprise and other parties to detect and identify common security threats.

Other features, functionality, and advantages of an aPaaS system may exist. This description is for purpose of example and is not intended to be limiting.

As an example of the aPaaS development process, a software developer may be tasked to create a new application using the aPaaS system. First, the developer may define the data model, which specifies the types of data that the application uses and the relationships therebetween. Then, via a GUI of the aPaaS system, the developer enters (e.g., uploads) the data model. The aPaaS system automatically creates all of the corresponding database tables, fields, and relationships, which can then be accessed via an object-oriented services layer.

In addition, the aPaaS system can also build a fully-functional MVC application with client-side interfaces and server-side CRUD logic. This generated application may serve as the basis of further development for the user. Advantageously, the developer does not have to spend a large amount of time on basic application functionality. Further, since the application may be web-based, it can be accessed from any Internet-enabled client device. Alternatively or additionally, a local copy of the application may be able to be accessed, for instance, when Internet service is not available.

The aPaaS system may also support a rich set of pre-defined functionality that can be added to applications. These features include support for searching, email, templating, workflow design, reporting, analytics, social media, scripting, mobile-friendly output, and customized GUIs.

Such an aPaaS system may represent a GUI in various ways. For example, a server device of the aPaaS system may generate a representation of a GUI using a combination of HTML and JAVASCRIPT®. The JAVASCRIPT® may include client-side executable code, server-side executable code, or both. The server device may transmit or otherwise provide this representation to a client device for the client device to display on a screen according to its locally-defined look and feel. Alternatively, a representation of a GUI may take other forms, such as an intermediate form (e.g., JAVA® byte-code) that a client device can use to directly generate graphical output therefrom. Other possibilities exist.

Further, user interaction with GUI elements, such as buttons, menus, tabs, sliders, checkboxes, toggles, etc. may be referred to as "selection", "activation", or "actuation" thereof. These terms may be used regardless of whether the GUI elements are interacted with by way of keyboard, pointing device, touchscreen, or another mechanism.

An aPaaS architecture is particularly powerful when integrated with an enterprise's network and used to manage such a network. The following embodiments describe architectural and functional aspects of example aPaaS systems, as well as the features and advantages thereof.

II. EXAMPLE COMPUTING DEVICES AND CLOUD-BASED COMPUTING ENVIRONMENTS

FIG. 1 is a simplified block diagram exemplifying a computing device 100, illustrating some of the components that could be included in a computing device arranged to operate in accordance with the embodiments herein. Computing device 100 could be a client device (e.g., a device actively operated by a user), a server device (e.g., a device that provides computational services to client devices), or some other type of computational platform. Some server devices may operate as client devices from time to time in order to perform particular operations, and some client devices may incorporate server features.

In this example, computing device 100 includes processor 102, memory 104, network interface 106, and input/output unit 108, all of which may be coupled by system bus 110 or a similar mechanism. In some embodiments, computing device 100 may include other components and/or peripheral devices (e.g., detachable storage, printers, and so on).

Processor 102 may be one or more of any type of computer processing element, such as a central processing unit (CPU), a co-processor (e.g., a mathematics, graphics, or encryption co-processor), a digital signal processor (DSP), a network processor, and/or a form of integrated circuit or controller that performs processor operations. In some cases, processor 102 may be one or more single-core processors. In other cases, processor 102 may be one or more multi-core processors with multiple independent processing units. Processor 102 may also include register memory for temporarily storing instructions being executed and related data, as well as cache memory for temporarily storing recently-used instructions and data.

Memory 104 may be any form of computer-usable memory, including but not limited to random access memory (RAM), read-only memory (ROM), and non-volatile memory (e.g., flash memory, hard disk drives, solid state drives, compact discs (CDs), digital video discs (DVDs), and/or tape storage). Thus, memory 104 represents both main memory units, as well as long-term storage. Other types of memory may include biological memory.

Memory 104 may store program instructions and/or data on which program instructions may operate. By way of example, memory 104 may store these program instructions on a non-transitory, computer-readable medium, such that the instructions are executable by processor 102 to carry out any of the methods, processes, or operations disclosed in this specification or the accompanying drawings.

As shown in FIG. 1, memory 104 may include firmware 104A, kernel 104B, and/or applications 104C. Firmware 104A may be program code used to boot or otherwise initiate some or all of computing device 100. Kernel 104B may be an operating system, including modules for memory management, scheduling and management of processes, input/output, and communication. Kernel 104B may also include device drivers that allow the operating system to communicate with the hardware modules (e.g., memory units, networking interfaces, ports, and buses) of computing device 100. Applications 104C may be one or more user-space software programs, such as web browsers or email clients, as well as any software libraries used by these programs. Memory 104 may also store data used by these and other programs and applications.

Network interface 106 may take the form of one or more wireline interfaces, such as Ethernet (e.g., Fast Ethernet, Gigabit Ethernet, and so on). Network interface 106 may also support communication over one or more non-Ethernet media, such as coaxial cables or power lines, or over wide-area media, such as Synchronous Optical Networking (SONET) or digital subscriber line (DSL) technologies. Network interface 106 may additionally take the form of one or more wireless interfaces, such as IEEE 802.11 (Wifi), BLUETOOTH®, global positioning system (GPS), or a wide-area wireless interface. However, other forms of physical layer interfaces and other types of standard or proprietary communication protocols may be used over network interface 106. Furthermore, network interface 106 may comprise multiple physical interfaces. For instance, some embodiments of computing device 100 may include Ethernet, BLUETOOTH®, and Wifi interfaces.

Input/output unit 108 may facilitate user and peripheral device interaction with computing device 100. Input/output unit 108 may include one or more types of input devices, such as a keyboard, a mouse, a touch screen, and so on. Similarly, input/output unit 108 may include one or more types of output devices, such as a screen, monitor, printer, and/or one or more light emitting diodes (LEDs). Additionally or alternatively, computing device 100 may communicate with other devices using a universal serial bus (USB) or high-definition multimedia interface (HDMI) port interface, for example.

In some embodiments, one or more computing devices like computing device 100 may be deployed to support an aPaaS architecture. The exact physical location, connectivity, and configuration of these computing devices may be unknown and/or unimportant to client devices. Accordingly, the computing devices may be referred to as "cloud-based" devices that may be housed at various remote data center locations.

Figure 2:
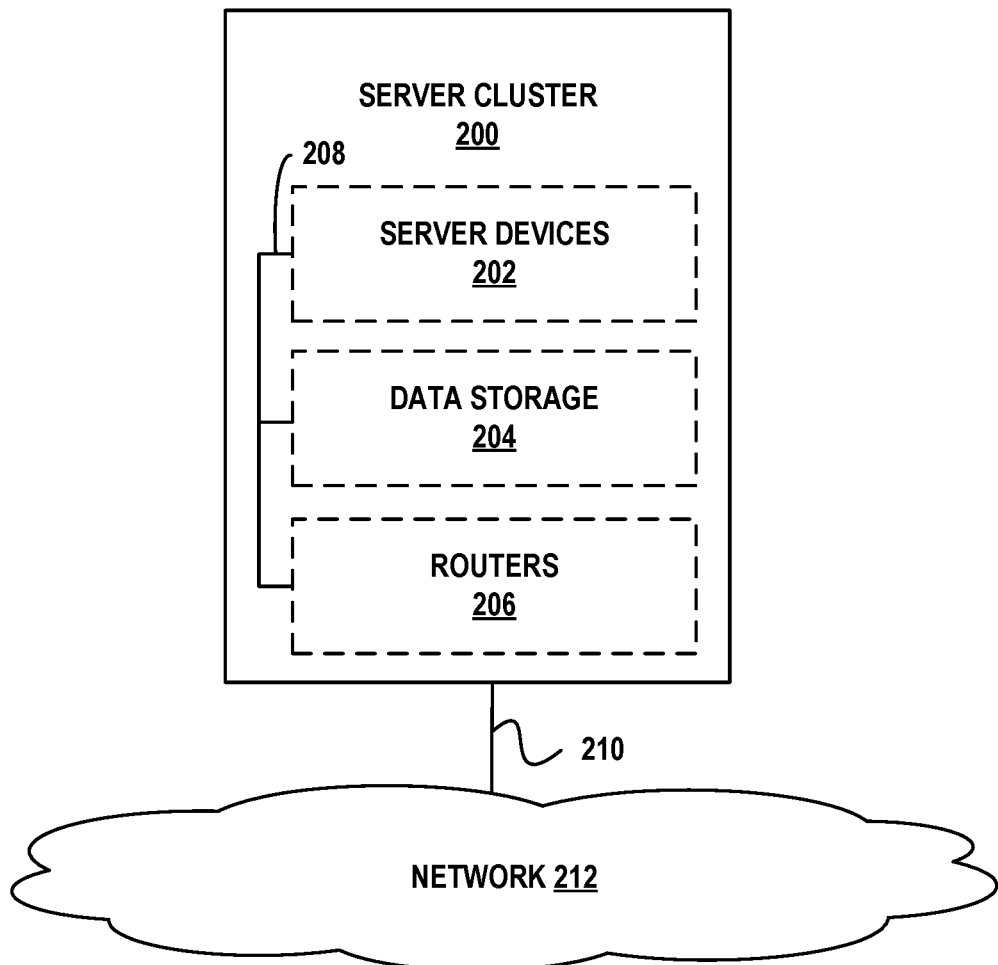
FIG. 2 illustrates a schematic drawing of a server device cluster, in accordance with example embodiments.

FIG. 2 depicts a cloud-based server cluster 200 in accordance with example embodiments. In FIG. 2, operations of a computing device (e.g., computing device 100) may be distributed between server devices 202, data storage 204, and routers 206, all of which may be connected by local cluster network 208. The number of server devices 202, data storages 204, and routers 206 in server cluster 200 may depend on the computing task(s) and/or applications assigned to server cluster 200.

For example, server devices 202 can be configured to perform various computing tasks of computing device 100. Thus, computing tasks can be distributed among one or more of server devices 202. To the extent that these computing tasks can be performed in parallel, such a distribution of tasks may reduce the total time to complete these tasks and return a result. For purposes of simplicity, both server cluster 200 and individual server devices 202 may be referred to as a "server device." This nomenclature should be understood to imply that one or more distinct server devices, data storage devices, and cluster routers may be involved in server device operations.

Data storage 204 may be data storage arrays that include drive array controllers configured to manage read and write access to groups of hard disk drives and/or solid state drives. The drive array controllers, alone or in conjunction with server devices 202, may also be configured to manage backup or redundant copies of the data stored in data storage 204 to protect against drive failures or other types of failures that prevent one or more of server devices 202 from accessing units of data storage 204. Other types of memory aside from drives may be used.

Routers 206 may include networking equipment configured to provide internal and external communications for server cluster 200. For example, routers 206 may include one or more packet-switching and/or routing devices (including switches and/or gateways) configured to provide (i) network communications between server devices 202 and data storage 204 via local cluster network 208, and/or (ii) network communications between server cluster 200 and other devices via communication link 210 to network 212.

Additionally, the configuration of routers 206 can be based at least in part on the data communication requirements of server devices 202 and data storage 204, the latency and throughput of the local cluster network 208, the latency, throughput, and cost of communication link 210, and/or other factors that may contribute to the cost, speed, fault-tolerance, resiliency, efficiency, and/or other design goals of the system architecture.

As a possible example, data storage 204 may include any form of database, such as a structured query language (SQL) database. Various types of data structures may store the information in such a database, including but not limited to tables, arrays, lists, trees, and tuples. Furthermore, any databases in data storage 204 may be monolithic or distributed across multiple physical devices.

Server devices 202 may be configured to transmit data to and receive data from data storage 204. This transmission and retrieval may take the form of SQL queries or other types of database queries, and the output of such queries, respectively. Additional text, images, video, and/or audio may be included as well. Furthermore, server devices 202 may organize the received data into web page or web application representations. Such a representation may take the form of a markup language, such as the hypertext markup language (HTML), the extensible markup language (XML), or some other standardized or proprietary format. Moreover, server devices 202 may have the capability of executing various types of computerized scripting languages, such as but not limited to Perl, Python, PHP Hypertext Preprocessor (PHP), Active Server Pages (ASP), JAVASCRIPT®, and so on. Computer program code written in these languages may facilitate the providing of web pages to client devices, as well as client device interaction with the web pages. Alternatively or additionally, JAVA® may be used to facilitate generation of web pages and/or to provide web application functionality.

III. EXAMPLE REMOTE NETWORK MANAGEMENT ARCHITECTURE

Figure 3:
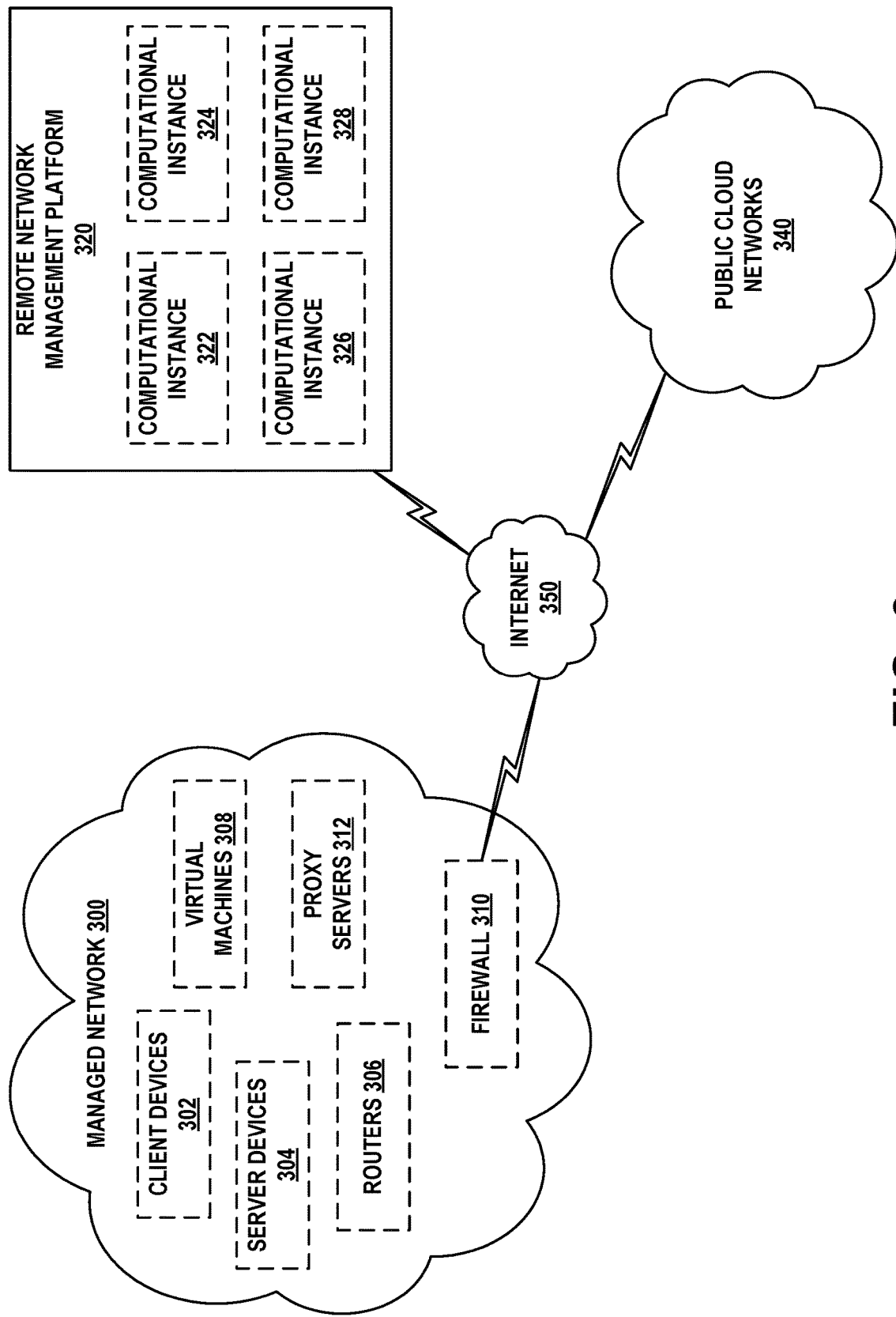
FIG. 3 depicts a remote network management architecture, in accordance with example embodiments.

FIG. 3 depicts a remote network management architecture, in accordance with example embodiments. This architecture includes three main components—managed network 300, remote network management platform 320, and public cloud networks 340—all connected by way of Internet 350.

A. Managed Networks

Managed network 300 may be, for example, an enterprise network used by an entity for computing and communications tasks, as well as storage of data. Thus, managed network 300 may include client devices 302, server devices 304, routers 306, virtual machines 308, firewall 310, and/or proxy servers 312. Client devices 302 may be embodied by computing device 100, server devices 304 may be embodied by computing device 100 or server cluster 200, and routers 306 may be any type of router, switch, or gateway.

Virtual machines 308 may be embodied by one or more of computing device 100 or server cluster 200. In general, a virtual machine is an emulation of a computing system, and mimics the functionality (e.g., processor, memory, and communication resources) of a physical computer. One physical computing system, such as server cluster 200, may support up to thousands of individual virtual machines. In some embodiments, virtual machines 308 may be managed by a centralized server device or application that facilitates allocation of physical computing resources to individual virtual machines, as well as performance and error reporting. Enterprises often employ virtual machines in order to allocate computing resources in an efficient, as needed fashion. Providers of virtualized computing systems include VMWARE® and MICROSOFT®.

Firewall 310 may be one or more specialized routers or server devices that protect managed network 300 from unauthorized attempts to access the devices, applications, and services therein, while allowing authorized communication that is initiated from managed network 300. Firewall 310 may also provide intrusion detection, web filtering, virus scanning, application-layer gateways, and other applications or services. In some embodiments not shown in FIG. 3, managed network 300 may include one or more virtual private network (VPN) gateways with which it communicates with remote network management platform 320 (see below).

Managed network 300 may also include one or more proxy servers 312. An embodiment of proxy servers 312 may be a server application that facilitates communication and movement of data between managed network 300, remote network management platform 320, and public cloud networks 340. In particular, proxy servers 312 may be able to establish and maintain secure communication sessions with one or more computational instances of remote network management platform 320. By way of such a session, remote network management platform 320 may be able to discover and manage aspects of the architecture and configuration of managed network 300 and its components. Possibly with the assistance of proxy servers 312, remote network management platform 320 may also be able to discover and manage aspects of public cloud networks 340 that are used by managed network 300.

Firewalls, such as firewall 310, typically deny all communication sessions that are incoming by way of Internet 350, unless such a session was ultimately initiated from behind the firewall (i.e., from a device on managed network 300) or the firewall has been explicitly configured to support the session. By placing proxy servers 312 behind firewall 310 (e.g., within managed network 300 and protected by firewall 310), proxy servers 312 may be able to initiate these communication sessions through firewall 310. Thus, firewall 310 might not have to be specifically configured to support incoming sessions from remote network management platform 320, thereby avoiding potential security risks to managed network 300.

In some cases, managed network 300 may consist of a few devices and a small number of networks. In other deployments, managed network 300 may span multiple physical locations and include hundreds of networks and hundreds of thousands of devices. Thus, the architecture depicted in FIG. 3 is capable of scaling up or down by orders of magnitude.

Furthermore, depending on the size, architecture, and connectivity of managed network 300, a varying number of proxy servers 312 may be deployed therein. For example, each one of proxy servers 312 may be responsible for communicating with remote network management platform 320 regarding a portion of managed network 300. Alternatively or additionally, sets of two or more proxy servers may be assigned to such a portion of managed network 300 for purposes of load balancing, redundancy, and/or high availability.

B. Remote Network Management Platforms

Remote network management platform 320 is a hosted environment that provides aPaaS services to users, particularly to the operator of managed network 300. These services may take the form of web-based portals, for example, using the aforementioned web-based technologies. Thus, a user can securely access remote network management platform 320 from, for example, client devices 302, or potentially from a client device outside of managed network 300. By way of the web-based portals, users may design, test, and deploy applications, generate reports, view analytics, and perform other tasks.

As shown in FIG. 3, remote network management platform 320 includes four computational instances 322, 324, 326, and 328. Each of these computational instances may represent one or more server nodes operating dedicated copies of the aPaaS software and/or one or more database nodes. The arrangement of server and database nodes on physical server devices and/or virtual machines can be flexible and may vary based on enterprise needs. In combination, these nodes may provide a set of web portals, services, and applications (e.g., a wholly-functioning aPaaS system) available to a particular enterprise. In some cases, a single enterprise may use multiple computational instances.

For example, managed network 300 may be an enterprise customer of remote network management platform 320, and may use computational instances 322, 324, and 326. The reason for providing multiple computational instances to one customer is that the customer may wish to independently develop, test, and deploy its applications and services. Thus, computational instance 322 may be dedicated to application development related to managed network 300, computational instance 324 may be dedicated to testing these applications, and computational instance 326 may be dedicated to the live operation of tested applications and services. A computational instance may also be referred to as a hosted instance, a remote instance, a customer instance, or by some other designation. Any application deployed onto a computational instance may be a scoped application, in that its access to databases within the computational instance can be restricted to certain elements therein (e.g., one or more particular database tables or particular rows within one or more database tables).

For purposes of clarity, the disclosure herein refers to the arrangement of application nodes, database nodes, aPaaS software executing thereon, and underlying hardware as a "computational instance." Note that users may colloquially refer to the graphical user interfaces provided thereby as "instances." But unless it is defined otherwise herein, a "computational instance" is a computing system disposed within remote network management platform 320.

The multi-instance architecture of remote network management platform 320 is in contrast to conventional multi-tenant architectures, over which multi-instance architectures exhibit several advantages. In multi-tenant architectures, data from different customers (e.g., enterprises) are comingled in a single database. While these customers' data are separate from one another, the separation is enforced by the software that operates the single database. As a consequence, a security breach in this system may impact all customers' data, creating additional risk, especially for entities subject to governmental, healthcare, and/or financial regulation. Furthermore, any database operations that impact one customer will likely impact all customers sharing that database. Thus, if there is an outage due to hardware or software errors, this outage affects all such customers. Likewise, if the database is to be upgraded to meet the needs of one customer, it will be unavailable to all customers during the upgrade process. Often, such maintenance windows will be long, due to the size of the shared database.

In contrast, the multi-instance architecture provides each customer with its own database in a dedicated computing instance. This prevents comingling of customer data, and allows each instance to be independently managed. For example, when one customer's instance experiences an outage due to errors or an upgrade, other computational instances are not impacted. Maintenance down time is limited because the database only contains one customer's data. Further, the simpler design of the multi-instance architecture allows redundant copies of each customer database and instance to be deployed in a geographically diverse fashion. This facilitates high availability, where the live version of the customer's instance can be moved when faults are detected or maintenance is being performed.

In some embodiments, remote network management platform 320 may include one or more central instances, controlled by the entity that operates this platform. Like a computational instance, a central instance may include some number of application and database nodes disposed upon some number of physical server devices or virtual machines. Such a central instance may serve as a repository for specific configurations of computational instances as well as data that can be shared amongst at least some of the computational instances. For instance, definitions of common security threats that could occur on the computational instances, software packages that are commonly discovered on the computational instances, and/or an application store for applications that can be deployed to the computational instances may reside in a central instance. Computational instances may communicate with central instances by way of well-defined interfaces in order to obtain this data.

In order to support multiple computational instances in an efficient fashion, remote network management platform 320 may implement a plurality of these instances on a single hardware platform. For example, when the aPaaS system is implemented on a server cluster such as server cluster 200, it may operate virtual machines that dedicate varying amounts of computational, storage, and communication resources to instances. But full virtualization of server cluster 200 might not be necessary, and other mechanisms may be used to separate instances. In some examples, each instance may have a dedicated account and one or more dedicated databases on server cluster 200. Alternatively, a computational instance such as computational instance 322 may span multiple physical devices.

In some cases, a single server cluster of remote network management platform 320 may support multiple independent enterprises. Furthermore, as described below, remote network management platform 320 may include multiple server clusters deployed in geographically diverse data centers in order to facilitate load balancing, redundancy, and/or high availability.

C. Public Cloud Networks

Public cloud networks 340 may be remote server devices (e.g., a plurality of server clusters such as server cluster 200) that can be used for outsourced computation, data storage, communication, and service hosting operations. These servers may be virtualized (i.e., the servers may be virtual machines). Examples of public cloud networks 340 may include AMAZON WEB SERVICES® and MICROSOFT® AZURE®. Like remote network management platform 320, multiple server clusters supporting public cloud networks 340 may be deployed at geographically diverse locations for purposes of load balancing, redundancy, and/or high availability.

Managed network 300 may use one or more of public cloud networks 340 to deploy applications and services to its clients and customers. For instance, if managed network 300 provides online music streaming services, public cloud networks 340 may store the music files and provide web interface and streaming capabilities. In this way, the enterprise of managed network 300 does not have to build and maintain its own servers for these operations.

Remote network management platform 320 may include modules that integrate with public cloud networks 340 to expose virtual machines and managed services therein to managed network 300. The modules may allow users to request virtual resources, discover allocated resources, and provide flexible reporting for public cloud networks 340. In order to establish this functionality, a user from managed network 300 might first establish an account with public cloud networks 340, and request a set of associated resources. Then, the user may enter the account information into the appropriate modules of remote network management platform 320. These modules may then automatically discover the manageable resources in the account, and also provide reports related to usage, performance, and billing.

D. Communication Support and Other Operations

Internet 350 may represent a portion of the global Internet. However, Internet 350 may alternatively represent a different type of network, such as a private wide-area or local-area packet-switched network.

Figure 4:
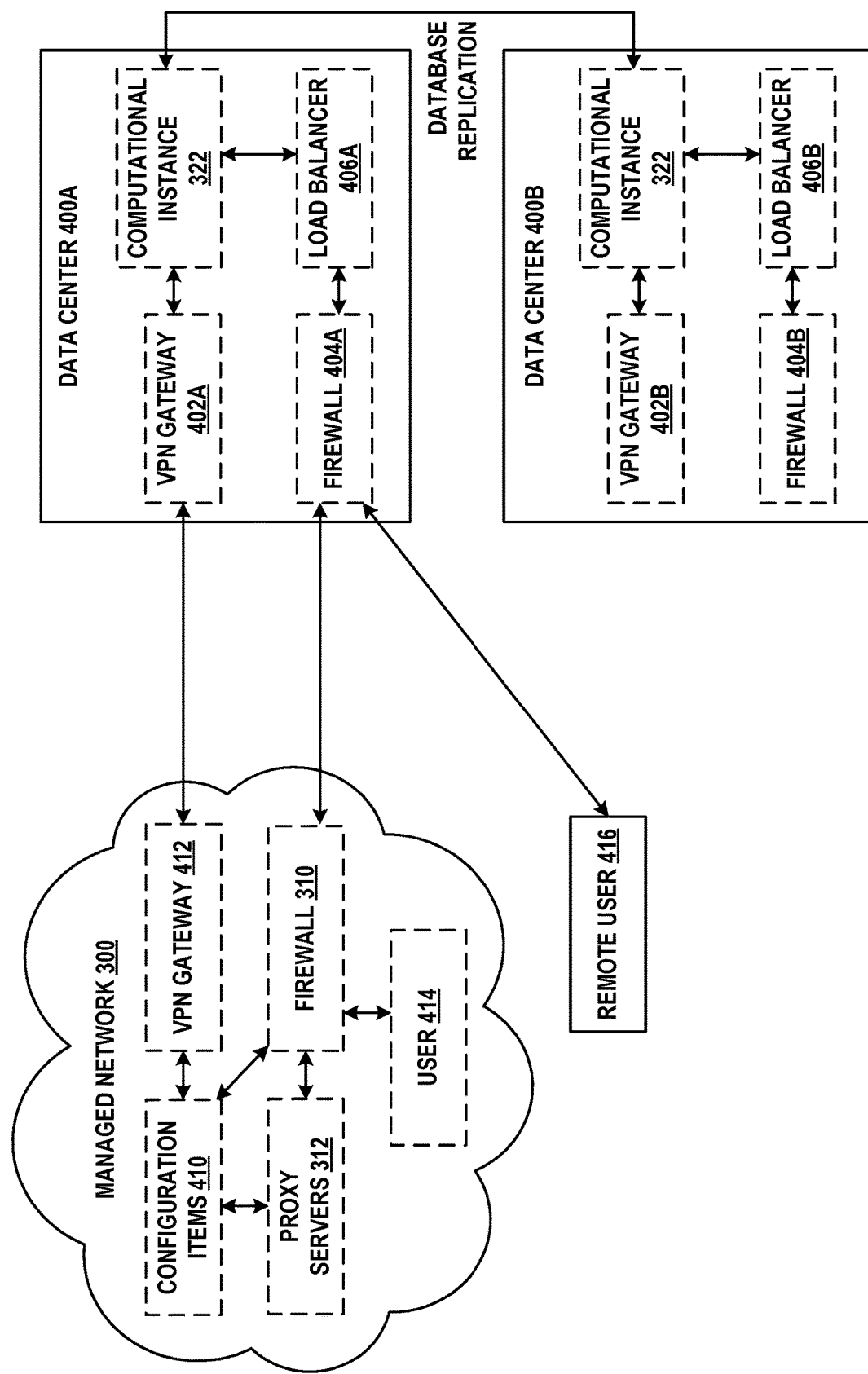
FIG. 4 depicts a communication environment involving a remote network management architecture, in accordance with example embodiments.

FIG. 4 further illustrates the communication environment between managed network 300 and computational instance 322, and introduces additional features and alternative embodiments. In FIG. 4, computational instance 322 is replicated across data centers 400A and 400B. These data centers may be geographically distant from one another, perhaps in different cities or different countries. Each data center includes support equipment that facilitates communication with managed network 300, as well as remote users.

In data center 400A, network traffic to and from external devices flows either through VPN gateway 402A or firewall 404A. VPN gateway 402A may be peered with VPN gateway 412 of managed network 300 by way of a security protocol such as Internet Protocol Security (IPSEC) or Transport Layer Security (TLS). Firewall 404A may be configured to allow access from authorized users, such as user 414 and remote user 416, and to deny access to unauthorized users. By way of firewall 404A, these users may access computational instance 322, and possibly other computational instances. Load balancer 406A may be used to distribute traffic amongst one or more physical or virtual server devices that host computational instance 322. Load balancer 406A may simplify user access by hiding the internal configuration of data center 400A, (e.g., computational instance 322) from client devices. For instance, if computational instance 322 includes multiple physical or virtual computing devices that share access to multiple databases, load balancer 406A may distribute network traffic and processing tasks across these computing devices and databases so that no one computing device or database is significantly busier than the others. In some embodiments, computational instance 322 may include VPN gateway 402A, firewall 404A, and load balancer 406A.

Data center 400B may include its own versions of the components in data center 400A. Thus, VPN gateway 402B, firewall 404B, and load balancer 406B may perform the same or similar operations as VPN gateway 402A, firewall 404A, and load balancer 406A, respectively. Further, by way of real-time or near-real-time database replication and/or other operations, computational instance 322 may exist simultaneously in data centers 400A and 400B.

Data centers 400A and 400B as shown in FIG. 4 may facilitate redundancy and high availability. In the configuration of FIG. 4, data center 400A is active and data center 400B is passive. Thus, data center 400A is serving all traffic to and from managed network 300, while the version of computational instance 322 in data center 400B is being updated in near-real-time. Other configurations, such as one in which both data centers are active, may be supported.

Should data center 400A fail in some fashion or otherwise become unavailable to users, data center 400B can take over as the active data center. For example, domain name system (DNS) servers that associate a domain name of computational instance 322 with one or more Internet Protocol (IP) addresses of data center 400A may re-associate the domain name with one or more IP addresses of data center 400B. After this re-association completes (which may take less than one second or several seconds), users may access computational instance 322 by way of data center 400B.

FIG. 4 also illustrates a possible configuration of managed network 300. As noted above, proxy servers 312 and user 414 may access computational instance 322 through firewall 310. Proxy servers 312 may also access configuration items 410. In FIG. 4, configuration items 410 may refer to any or all of client devices 302, server devices 304, routers 306, and virtual machines 308, any applications or services executing thereon, as well as relationships between devices, applications, and services. Thus, the term "configuration items" may be shorthand for any physical or virtual device, or any application or service remotely discoverable or managed by computational instance 322, or relationships between discovered devices, applications, and services. Configuration items may be represented in a configuration management database (CMDB) of computational instance 322.

As noted above, VPN gateway 412 may provide a dedicated VPN to VPN gateway 402A. Such a VPN may be helpful when there is a significant amount of traffic between managed network 300 and computational instance 322, or security policies otherwise suggest or require use of a VPN between these sites. In some embodiments, any device in managed network 300 and/or computational instance 322 that directly communicates via the VPN is assigned a public IP address. Other devices in managed network 300 and/or computational instance 322 may be assigned private IP addresses (e.g., IP addresses selected from the 10.0.0.0-10.255.255.255 or 192.168.0.0-192.168.255.255 ranges, represented in shorthand as subnets 10.0.0.0/8 and 192.168.0.0/16, respectively).

IV. EXAMPLE DEVICE, APPLICATION, AND SERVICE DISCOVERY

In order for remote network management platform 320 to administer the devices, applications, and services of managed network 300, remote network management platform 320 may first determine what devices are present in managed network 300, the configurations and operational statuses of these devices, and the applications and services provided by the devices, as well as the relationships between discovered devices, applications, and services. As noted above, each device, application, service, and relationship may be referred to as a configuration item. The process of defining configuration items within managed network 300 is referred to as discovery, and may be facilitated at least in part by proxy servers 312.

For purposes of the embodiments herein, an "application" may refer to one or more processes, threads, programs, client modules, server modules, or any other software that executes on a device or group of devices. A "service" may refer to a high-level capability provided by multiple applications executing on one or more devices working in conjunction with one another. For example, a high-level web service may involve multiple web application server threads executing on one device and accessing information from a database application that executes on another device.

Figure 5A:
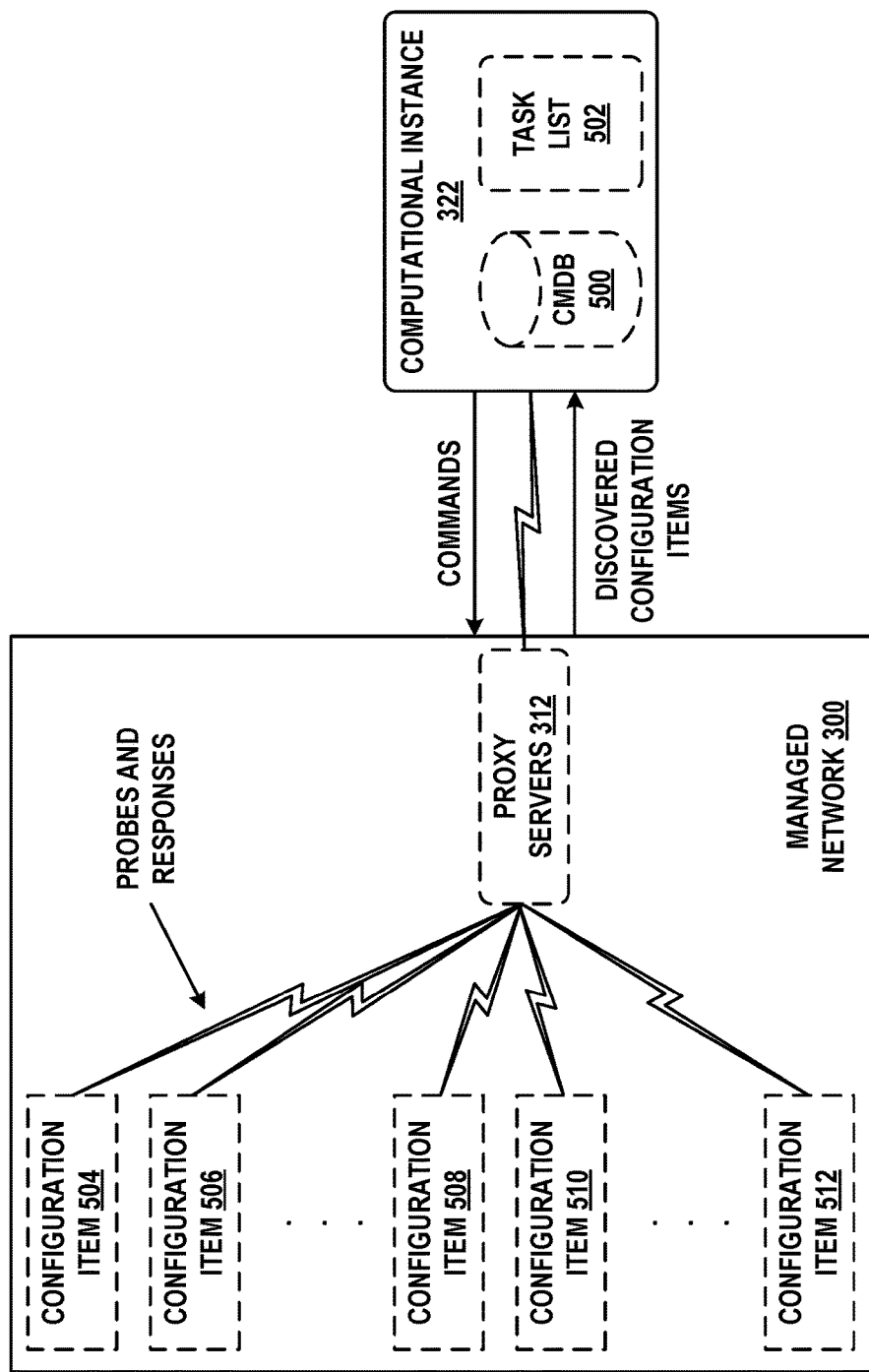
FIG. 5A depicts another communication environment involving a remote network management architecture, in accordance with example embodiments.

FIG. 5A provides a logical depiction of how configuration items can be discovered, as well as how information related to discovered configuration items can be stored. For sake of simplicity, remote network management platform 320, public cloud networks 340, and Internet 350 are not shown.

In FIG. 5A, CMDB 500 and task list 502 are stored within computational instance 322. Computational instance 322 may transmit discovery commands to proxy servers 312. In response, proxy servers 312 may transmit probes to various devices, applications, and services in managed network 300. These devices, applications, and services may transmit responses to proxy servers 312, and proxy servers 312 may then provide information regarding discovered configuration items to CMDB 500 for storage therein. Configuration items stored in CMDB 500 represent the environment of managed network 300.

Task list 502 represents a list of activities that proxy servers 312 are to perform on behalf of computational instance 322. As discovery takes place, task list 502 is populated. Proxy servers 312 repeatedly query task list 502, obtain the next task therein, and perform this task until task list 502 is empty or another stopping condition has been reached.

To facilitate discovery, proxy servers 312 may be configured with information regarding one or more subnets in managed network 300 that are reachable by way of proxy servers 312. For instance, proxy servers 312 may be given the IP address range 192.168.0/24 as a subnet. Then, computational instance 322 may store this information in CMDB 500 and place tasks in task list 502 for discovery of devices at each of these addresses.

FIG. 5A also depicts devices, applications, and services in managed network 300 as configuration items 504, 506, 508, 510, and 512. As noted above, these configuration items represent a set of physical and/or virtual devices (e.g., client devices, server devices, routers, or virtual machines), applications executing thereon (e.g., web servers, email servers, databases, or storage arrays), relationships therebetween, as well as services that involve multiple individual configuration items.

Placing the tasks in task list 502 may trigger or otherwise cause proxy servers 312 to begin discovery. Alternatively or additionally, discovery may be manually triggered or automatically triggered based on triggering events (e.g., discovery may automatically begin once per day at a particular time).

In general, discovery may proceed in four logical phases: scanning, classification, identification, and exploration. Each phase of discovery involves various types of probe messages being transmitted by proxy servers 312 to one or more devices in managed network 300. The responses to these probes may be received and processed by proxy servers 312, and representations thereof may be transmitted to CMDB 500. Thus, each phase can result in more configuration items being discovered and stored in CMDB 500.

In the scanning phase, proxy servers 312 may probe each IP address in the specified range of IP addresses for open Transmission Control Protocol (TCP) and/or User Datagram Protocol (UDP) ports to determine the general type of device. The presence of such open ports at an IP address may indicate that a particular application is operating on the device that is assigned the IP address, which in turn may identify the operating system used by the device. For example, if TCP port 135 is open, then the device is likely executing a WINDOWS® operating system. Similarly, if TCP port 22 is open, then the device is likely executing a UNIX® operating system, such as LINUX®. If UDP port 161 is open, then the device may be able to be further identified through the Simple Network Management Protocol (SNMP). Other possibilities exist. Once the presence of a device at a particular IP address and its open ports have been discovered, these configuration items are saved in CMDB 500.

In the classification phase, proxy servers 312 may further probe each discovered device to determine the version of its operating system. The probes used for a particular device are based on information gathered about the devices during the scanning phase. For example, if a device is found with TCP port 22 open, a set of UNIX®-specific probes may be used. Likewise, if a device is found with TCP port 135 open, a set of WINDOWS®-specific probes may be used. For either case, an appropriate set of tasks may be placed in task list 502 for proxy servers 312 to carry out. These tasks may result in proxy servers 312 logging on, or otherwise accessing information from the particular device. For instance, if TCP port 22 is open, proxy servers 312 may be instructed to initiate a Secure Shell (SSH) connection to the particular device and obtain information about the operating system thereon from particular locations in the file system. Based on this information, the operating system may be determined. As an example, a UNIX® device with TCP port 22 open may be classified as AIX®, HPUX, LINUX®, MACOS®, or SOLARIS®. This classification information may be stored as one or more configuration items in CMDB 500.

In the identification phase, proxy servers 312 may determine specific details about a classified device. The probes used during this phase may be based on information gathered about the particular devices during the classification phase. For example, if a device was classified as LINUX®, a set of LINUX®-specific probes may be used. Likewise, if a device was classified as WINDOWS® 2012, as a set of WINDOWS®-2012-specific probes may be used. As was the case for the classification phase, an appropriate set of tasks may be placed in task list 502 for proxy servers 312 to carry out. These tasks may result in proxy servers 312 reading information from the particular device, such as basic input/output system (BIOS) information, serial numbers, network interface information, media access control address(es) assigned to these network interface(s), IP address(es) used by the particular device and so on. This identification information may be stored as one or more configuration items in CMDB 500.

In the exploration phase, proxy servers 312 may determine further details about the operational state of a classified device. The probes used during this phase may be based on information gathered about the particular devices during the classification phase and/or the identification phase. Again, an appropriate set of tasks may be placed in task list 502 for proxy servers 312 to carry out. These tasks may result in proxy servers 312 reading additional information from the particular device, such as processor information, memory information, lists of running processes (applications), and so on. Once more, the discovered information may be stored as one or more configuration items in CMDB 500.

Running discovery on a network device, such as a router, may utilize SNMP. Instead of or in addition to determining a list of running processes or other application-related information, discovery may determine additional subnets known to the router and the operational state of the router's network interfaces (e.g., active, inactive, queue length, number of packets dropped, etc.). The IP addresses of the additional subnets may be candidates for further discovery procedures. Thus, discovery may progress iteratively or recursively.

Once discovery completes, a snapshot representation of each discovered device, application, and service is available in CMDB 500. For example, after discovery, operating system version, hardware configuration, and network configuration details for client devices, server devices, and routers in managed network 300, as well as applications executing thereon, may be stored. This collected information may be presented to a user in various ways to allow the user to view the hardware composition and operational status of devices, as well as the characteristics of services that span multiple devices and applications.

Furthermore, CMDB 500 may include entries regarding dependencies and relationships between configuration items. More specifically, an application that is executing on a particular server device, as well as the services that rely on this application, may be represented as such in CMDB 500. For example, suppose that a database application is executing on a server device, and that this database application is used by a new employee onboarding service as well as a payroll service. Thus, if the server device is taken out of operation for maintenance, it is clear that the employee onboarding service and payroll service will be impacted. Likewise, the dependencies and relationships between configuration items may be able to represent the services impacted when a particular router fails.

In general, dependencies and relationships between configuration items may be displayed on a web-based interface and represented in a hierarchical fashion. Thus, adding, changing, or removing such dependencies and relationships may be accomplished by way of this interface.

Furthermore, users from managed network 300 may develop workflows that allow certain coordinated activities to take place across multiple discovered devices. For instance, an IT workflow might allow the user to change the common administrator password to all discovered LINUX® devices in a single operation.

In order for discovery to take place in the manner described above, proxy servers 312, CMDB 500, and/or one or more credential stores may be configured with credentials for one or more of the devices to be discovered. Credentials may include any type of information needed in order to access the devices. These may include userid/password pairs, certificates, and so on. In some embodiments, these credentials may be stored in encrypted fields of CMDB 500. Proxy servers 312 may contain the decryption key for the credentials so that proxy servers 312 can use these credentials to log on to or otherwise access devices being discovered.

Figure 5B:
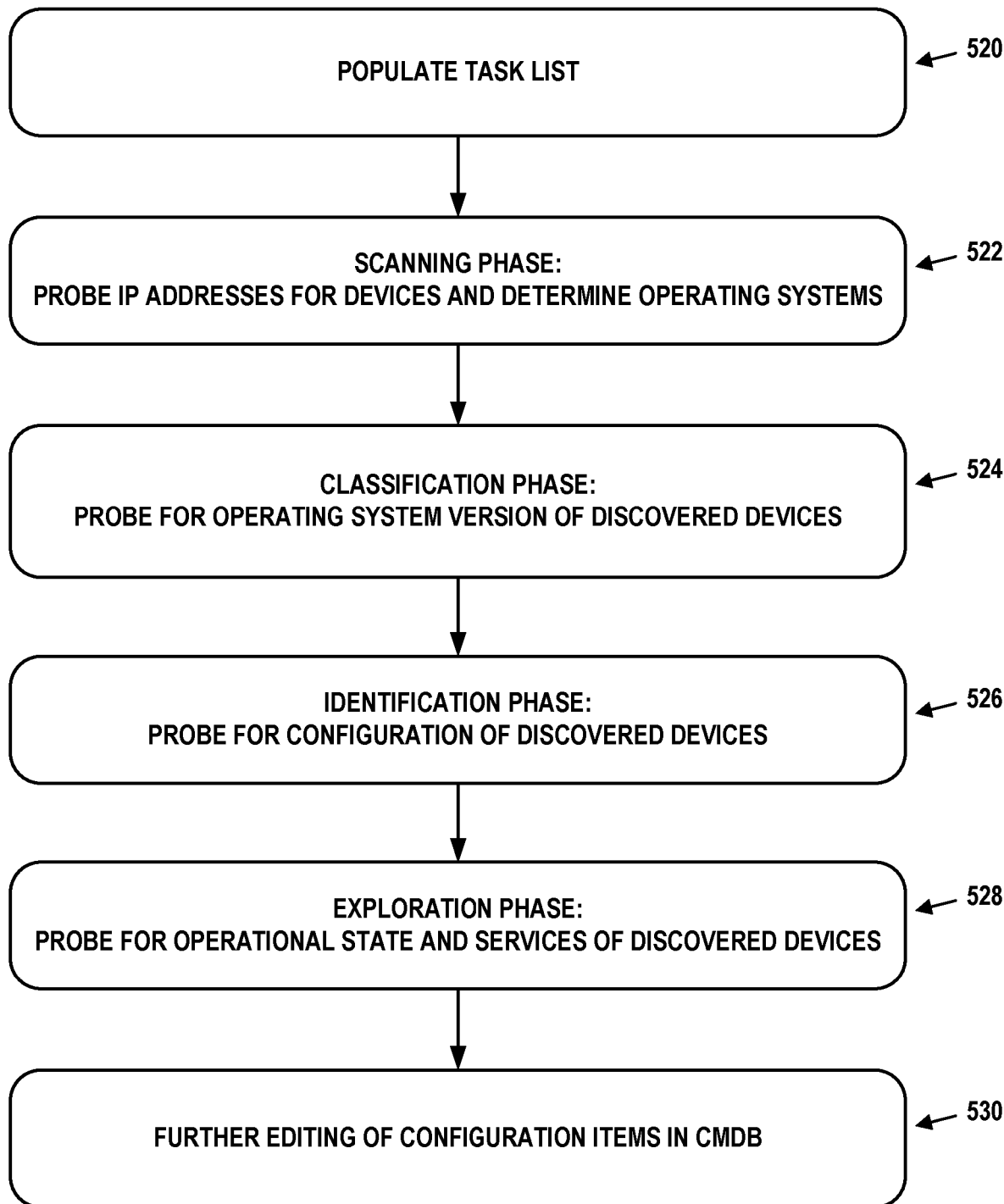
FIG. 5B is a flow chart, in accordance with example embodiments.

The discovery process is depicted as a flow chart in FIG. 5B. At block 520, the task list in the computational instance is populated, for instance, with a range of IP addresses. At block 522, the scanning phase takes place. Thus, the proxy servers probe the IP addresses for devices using these IP addresses, and attempt to determine the operating systems that are executing on these devices. At block 524, the classification phase takes place. The proxy servers attempt to determine the operating system version of the discovered devices. At block 526, the identification phase takes place. The proxy servers attempt to determine the hardware and/or software configuration of the discovered devices. At block 528, the exploration phase takes place. The proxy servers attempt to determine the operational state and applications executing on the discovered devices. At block 530, further editing of the configuration items representing the discovered devices and applications may take place. This editing may be automated and/or manual in nature.

The blocks represented in FIG. 5B are examples. Discovery may be a highly configurable procedure that can have more or fewer phases, and the operations of each phase may vary. In some cases, one or more phases may be customized, or may otherwise deviate from the exemplary descriptions above.

In this manner, a remote network management platform may discover and inventory the hardware, software, and services deployed on and provided by the managed network. As noted above, this data may be stored in a CMDB of the associated computational instance as configuration items. For example, individual hardware components (e.g., computing devices, virtual servers, databases, routers, etc.) may be represented as hardware configuration items, while the applications installed and/or executing thereon may be represented as software configuration items.

The relationship between a software configuration item installed or executing on a hardware configuration item may take various forms, such as "is hosted on", "runs on", or "depends on". Thus, a database application installed on a server device may have the relationship "is hosted on" with the server device to indicate that the database application is hosted on the server device. In some embodiments, the server device may have a reciprocal relationship of "used by" with the database application to indicate that the server device is used by the database application. These relationships may be automatically found using the discovery procedures described above, though it is possible to manually set relationships as well.

The relationship between a service and one or more software configuration items may also take various forms. As an example, a web service may include a web server software configuration item and a database application software configuration item, each installed on different hardware configuration items. The web service may have a "depends on" relationship with both of these software configuration items, while the software configuration items have a "used by" reciprocal relationship with the web service. Services might not be able to be fully determined by discovery procedures, and instead may rely on service mapping (e.g., probing configuration files and/or carrying out network traffic analysis to determine service level relationships between configuration items) and possibly some extent of manual configuration.

Regardless of how relationship information is obtained, it can be valuable for the operation of a managed network. Notably, IT personnel can quickly determine where certain software applications are deployed, and what configuration items make up a service. This allows for rapid pinpointing of root causes of service outages or degradation. For example, if two different services are suffering from slow response times, the CMDB can be queried (perhaps among other activities) to determine that the root cause is a database application that is used by both services having high processor utilization. Thus, IT personnel can address the database application rather than waste time considering the health and performance of other configuration items that make up the services.

V. CONTEXT-AWARE AUTOMATED ROOT CAUSE ANALYSIS

As noted, the CMDB records relating to network infrastructure, devices, software, and services can be useful in root cause analysis. But a remote network management platform often has more information at its disposal that can be used to this end. The embodiments herein employ this additional information to provide a faster and more accurate root cause analysis, thereby reducing MTTR for problems experienced by a managed network.

Figure 6:
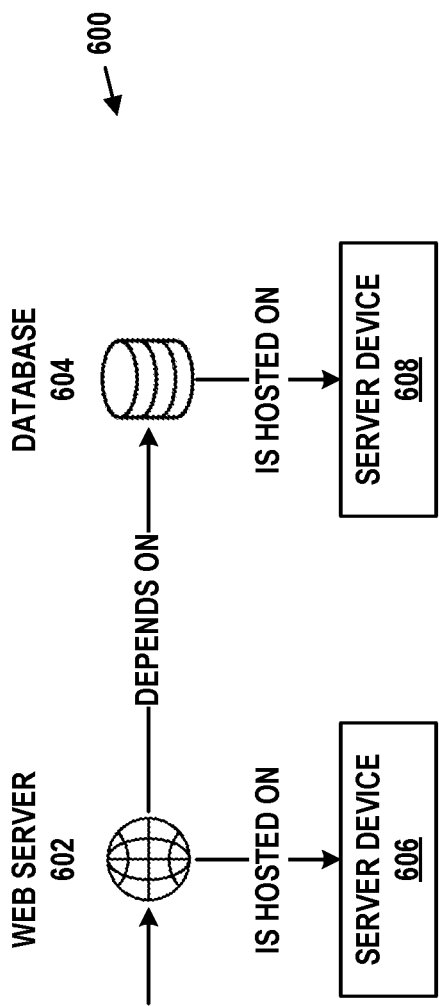
FIG. 6 depicts an example managed network segment providing a web-based service, in accordance with example embodiments.

To illustrate the challenges associated with root cause analysis, FIG. 6 depicts an example service 600. This is just a simple example. The difficulty in determining the root cause of a problem is exacerbated as the size of the network and the complexity of the service increases.

Service 600 includes web server 602 hosted on server device 606 and database 604 hosted on server device 608. Web server 602 depends on database 604, in that web server 602 may obtain data from database 604 in order to construct web pages that are served in response to web requests.

A discovery procedure may determine the presence of server device 606 and server device 608, and query these devices for installed and/or executing software packages thereon. In doing so, the discovery procedure may determine that web server 602 is hosted on server device 606 and that database 604 is hosted on server device 608. Furthermore, the discovery procedure may read the configuration files of web server 602 to identify that it depends on database 604. All of this information regarding these devices, the software applications, and the relationships therebetween may be stored in a CMDB.

Service 600 can be disrupted by numerous factors. For example, if the processor utilization becomes too high or the memory utilization becomes too high on either of server device 606 and/or server device 608, service 600 may be unable to serve web requests, or the responses to these requests may suffer from latency. If web server 602 or database 604 are misconfigured, service 600 might not work at all. Similarly, if connectivity between web server 602 and database 604 is lost, service 600 again might not work at all.

Each of web server 602, database 604, server device 606, and server device 608 may be configured to generate and transmit alerts to a central alert repository when specific problems are detected. For instance, web server 602 may generate and transmit an alert when it finds an error in its configuration files or cannot establish connectivity to database 604. Database 604 may generate and transmit an alert when it cannot properly initialize or when it finds an error in its configuration files. Server device 606 and server device 608 may be configured to transmit errors when their respective processor or memory utilizations pass a threshold (e.g., 90% or 95%).

The central repository may be deployed within the managed network (e.g., in conjunction with a proxy server), and may ultimately provide received alerts to an event management application operational within the computational instance assigned to the managed network. The event management application may aggregate these alerts and provide representations thereof upon demand by way of web-based interfaces.

But even with robust alerting and event management, it can still be difficult to determine the root cause of a problem. For example, suppose that web server 602 generates and transmits an alert indicating that it cannot connect to database 604. This problem may have several possible root causes: (i) a misconfiguration of web server 602, (ii) a misconfiguration of database 604, (iii) connectivity issues between web server 602 and database 604, (iv) high processor or memory utilization on server device 606, or (v) high processor or memory utilization on server device 608. Thus, in order to determine root cause, all five of these potential problems may need to be investigated.

As noted above, service 600 is just a simple example. A more complex service could have dozens of potential root causes per problem. Thus, the MTTR for resolving such an issue can be several hours or more as these possible root causes are each investigated.

Consequently, it is advantageous to be able to reduce the number of possible root causes to a more manageable level. This can be done by leveraging information that may already be present in the computational instance. For example, most managed networks use their computational instances to store records of change requests and/or incidents. This information may be stored as separate sets of tables in the CMDB or in different databases, and may provide further details regarding changes to or observed problems with configuration items in the managed network. In some cases, these further details suggest that a particular configuration item or set of configuration items are most likely responsible for causing an alert to be generated and transmitted.

Change management can refer to a software application operational on a computational instance that controls the lifecycle of changes made to the managed network, including any aspects of its IT environment. Thus, change management may provide a change lifecycle that documents the extent of a proposed change (e.g., describes configuration items impacted by the change), obtains approval for the proposed change to be executed, and then tracks progress of the change.

A goal of this application is to enable beneficial changes to be made to the managed network with little or no disruption to IT services. Further, changes can be rolled out in an organized and documented fashion, rather than on an ad-hoc basis. Examples of changes can be hardware replacements, software installations, software upgrades or patches, configuration modifications, and network topology alternations, as well as the removal of any device or software application from service.

As an example of the operation of a change management application, a change request may be submitted to the system by a user, such as an IT manager, other IT professional, or end user. The change request can record information describing the change, impacted configuration items, its priority, a target completion time (also referred to as a target remediation time), a state, to whom the change request is assigned, and possibly other information as well. More or less information may also be possible in change requests. The change management application may facilitate managing the lifetime of the change request and scheduling the implementation thereof.

An example change request is shown in FIG. 7, in the form of a graphical user interface. This may be, for example, a web-based graphical user interface provided by a computational instance.

Change request 700 includes a number of fields, such as its unique number, a type of the change, a requestor of the change, a state of the change request, a category of the change, a conflict status of the change request, a service related to the change, a configuration item impacted by the change, a group to which the change request is assigned, a priority, an individual to whom the change request is assigned, a risk level, and an impact. Other fields may be present, as shown in FIG. 7.

An alert group may be a set of alerts that have been batched together due to certain similarities. These similarities may be based on there being relationships between the configuration items that have triggered the issuance of these alerts and/or historical data from which correlations between certain types and sources of alerts have been learned. For example, alert groups may be formed for alerts from hosts (virtual or otherwise) on a particular computing device, or processes executing on a particular host. An alert group may be represented as a graph of relationships between configuration items or correlations between alerts.

Notable amongst the fields in change request 700 is change request number 702 (taking on a value of CHG0030026 in FIG. 7), which can be used to unambiguously identify the change request. Also notable is configuration item 704 (taking on a value of ABC-123 in FIG. 7), which unambiguously identifies the configuration item (or items) that is to be (or has been) impacted by the change. Another notable field is date completed 706, which indicates a time and date (e.g., Mar. 23, 2020 at 9:53 AM) when the change was performed. In FIG. 7, this field is empty, indicating that the change has not yet been performed.

Thus, from a particular change request, impacted configuration items can be determined and the date that the change was applied to these configuration items, can be determined. This information is valuable because it has been observed that the root causes of a large number of problems in managed networks are ultimately the results of changes. For instance, a software application may be patched to its latest version in order to add new functionality, but this version may have a defect that slowly causes memory utilization to increase, or might not be interoperable with other software applications of a service. Thus, change management data can be helpful in determining the root cause of a problem.

Likewise, incident management data can also be helpful for this purpose. Incident reports are often opened by technology users to describe a problem that they have experienced. Each incident report may also be referred to as a record. While incident reports may exist in various formats and contain various types of information, an example incident report 800 is shown in FIG. 8. Incident report 800 consists of a number of fields in the left column, at least some of which are associated with values in the right column.

These fields may identify the originator of the incident, the time at which the incident was created, a short description of the problem experienced, a longer description of the problem, a categorization of the incident, the IT personnel to whom the incident is assigned, the status of the incident, how the incident was resolved (if applicable), the time at which the incident was resolved (if applicable), the closure code of the incident (if applicable), any additional notes added to the record, a link to an online article that may help users avoid having to address a similar issue in the future, and a configuration item believed to be related to the incident.

Notable amongst these fields is incident number 802 (taking on a value of INC0000456 in FIG. 8), which can be used to unambiguously identify the incident. Also notable is created time 804 (taking on a value of 2020 Feb. 7 9:56 AM in FIG. 8), which identifies when the incident was created. Another notable field is configuration item 806 (taking on a value of ABC-123 in FIG. 8), which can be used to unambiguously identify a configuration item believed to be related to the incident. In some embodiments, more than one such configuration item may be identified.

Thus, from an incident report, potentially related configuration items can be determined and the date that the incident was reported can be determined. This information is valuable because it is likely that a configuration item that appears in one or more incident reports may be the root cause of a problem. For instance, multiple users may report a recent inability to access a particular server device. As a result, this server device may be the problem's cause, or at least related to the problem's cause (e.g., a software application executing on the server device may be the actual root cause rather than the server device itself). Thus, incident reports can be helpful in determining the root cause of a problem.

Change requests and incident reports are just two examples of the types of information that may be relevant to root cause analysis and available in a computational instance. Other types of information that could be used for this purpose may include problem reports, for example. Further, it is possible that discovery operations may determine that an unauthorized change has been made to the managed network (e.g., detection of a difference between the devices, software, and services detected by the current discovery pass in comparison to a previous discovery pass). These unauthorized changes may not appear in the change request records, and may be separately taken into account when determining root cause.

Figure 9:
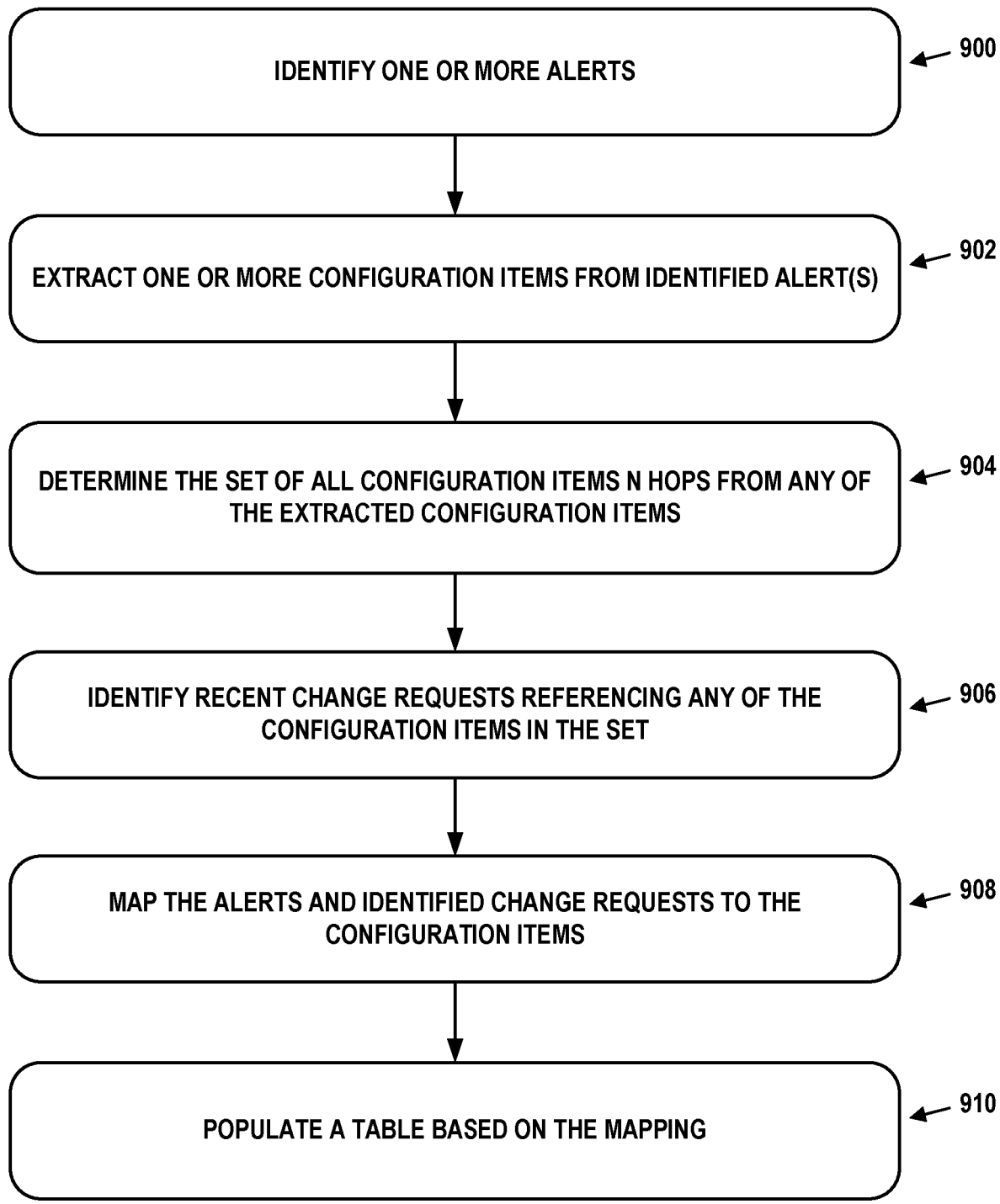
FIG. 9 is a flow chart, in accordance with example embodiments.

An example embodiment for determining root cause of a problem based on alerts and related change requests is shown in FIG. 9. This embodiment is intended to illustrate how change requests can be used to narrow down a list of potential configuration items that may be related to the root cause. Similar techniques can be used with incident reports or other types of information.

At block 900, one or more alerts are identified. These alerts may be from a group of alerts that an event management application has compiled due to similarity. There may be an underlying assumption that alerts within such a group all have the same root cause, though this assumption might not always be accurate.

At block 902, one or more configuration items may be extracted from the identified alert(s).

At block 904, the set of all configuration items n hops from any of the extracted configuration items are determined, where n>0. Hops are defined to be the topological distance between configuration items based on relationships in the CMDB. In practice, a value of 1 or 2 for n is usually sufficient. Finding the configuration items n hops from a particular configuration item may involve traversing configuration item relationships stored in the CMDB. This may involve any sufficient graph traversal algorithm. For instance, an extracted configuration item may be considered to be the root node of a tree of depth n overlaid on top of the graph, and this tree may be traversed on a depth-first or breadth-first basis.

For the example of service 600, suppose that an alert is received from web server 602 and n is 1. In this case, the established relationships between web server 602 and database 604, as well as between web server 602 and server device 606, may be used to build a list of configuration items. This list may include web server 602, database 604, and server device 606. Notably, server device 608 is not in this list because it is 2 hops from web server 602. But, if n is 2 or greater, server device 608 would be included in his list.

In some cases, different values for n may be used based on whether the configuration item determined from the alert is hardware or software (e.g., n may be 1 or 2 for hardware and n may be 3 or 4 for software). This reflects the observation that software relationships tend to be denser and more complicated than hardware relationships. The CMDB may include a field per configuration item that indicates the class of each configuration item, and whether a configuration item is hardware or software may be determined from this class.

At block 906, recent change requests referencing any of the configuration items in the set are identified. This involves searching the change request records for each of these configuration items. Here, a "recent" change request may be a change request that was completed (as indicated by date completed 706) within a predetermined period of time (e.g., 1 hour, 3 hours, 6 hours, 12, hours, 3 days, etc.). Since older changes are less likely to cause problems, this focuses the search of the change request records on those that are most likely to be related to a root cause. Further, if any of the configuration items are part of a defined service, any recent change request records that involve the service may also be identified.

At block 908, alerts and identified change requests may be mapped to the configuration items. Configuration items identified in alerts at block 902 may be marked as having an alert sources. Any configuration item for which a change request was found at block 906 may be marked as having a change request source. It is possible for configuration items to have both an alert source and a change request source. In the example of service 600, web server 602 may be marked as having an alert source. If a change request is found for database 604 but not for server device 606, database 604 would be marked as having a change request source and server device 606 would not.

At block 910, a table may be populated based on the mapping. This table may be a database table representing an ordered or sortable list of alerts and/or change request records found in the prior blocks. This table may be referred to as a probable root cause list. The ordering of the entries in the table may be based on a scoring function that provides a numeric value representing an estimated likelihood that the associated entry is the root cause.

FIG. 10 depicts such a table in the form of a graphical user interface. This graphical user interface may be generated and provided by the computational instance of the managed network. The graphical user interface contains four panes 1000, 1002, 1006, and 1014.

Pane 1000 contains the identifier of the alert being displayed, Alert0020561. This alert is the parent alert for which a root cause analysis is being performed.

Pane 1002 contains a description (e.g., error message) associated with Alert0020561 ("Cannot connect to database"), as well as some descriptors of Alert0020561. These may include a priority group, severity, state, identifier of a configuration item related to the alert, and category. Note that the name of the configuration item is "Web Server 602" in reference to that component in FIG. 6. This naming is for purposes of convenience. In various embodiments, other naming conventions (e.g., "ABC-123") may be used. In this example, it is assumed that the database being referred to is database 604.

Pane 1002 also includes three selectable tabs, one of which is tab 1004 ("Probable Root Cause (3)"). When tab 1004 is selected, this causes pane 1006 to display an ordered list of probable root causes for why web server 602 cannot connect to database 604. The "(3)" after "Probable Root Cause" indicates that there are three probable root causes identified.

Pane 1006 provides these three probable root causes. Probable root cause 1008 is a change request record ("CHG0030006") indicating that database 604 was subject to a MySQL upgrade on Mar. 20, 2020. Probable root cause 1010 is another change request record ("CHG0030006") indicating that web server 602 was subject to a security patch installation on Mar. 19, 2020. Probable root cause 1012 is an alert (possibly from the same alert group as Alert0020561) indicating that server device 606 was subject to high processor utilization on Mar. 19, 2020.

All three of these probable root causes indicate that they have Alert0020561 as a parent—e.g., the probable root causes were derived from operating the procedures of FIG. 9 on Alert0020561. Further, each of the probable root causes have associated therewith respective reasoning. "Change on CI" reasoning indicates that a change occurred on a configuration item that was identified from operating the procedures of FIG. 9 on Alert0020561. "Alert on rltd CI" reasoning indicates that there was an alert associated with a configuration item that was identified from operating the procedures of FIG. 9 on Alert0020561.

The probable root causes may be displayed in decreasing order of relevance. A score may be calculated for each probable root cause. This score may be based on the type of probable root cause (e.g., change or alert), how topologically close the associated configuration item is to the configuration item referenced by the parent alert (e.g., 1 hop, 2 hops, etc., where the lower the number of hops the more likely the associated change or alert is the actual root cause), the reasoning, and the date/time of the change or alert (e.g., the more recent the change or alert, the more likely that it is related to the actual root cause).

Numeric values may be assigned to each of these possibilities, and the score could be a weighted average of the numeric values, scaled to fall into a range (e.g., 0-10, 0-100, etc.). This estimation suggests that the higher the score, the more likely that a probable root cause is the actual root cause. Other values and ranges may be used, so long as the scores can be ordered.

As an example, change request record CHG0030006 may be ordered first because it has the highest score of all three probable root causes. This may be due to it being related to a recent change on a topologically nearby configuration item, and the other probable root causes are either less recent, less topologically close, or associated with an alert rather than a change (where changes are given more weight than alerts). Other scoring possibilities exist.

For instance, some embodiments may determine a topology origin for alerts and/or changes. Such a topology origin may be based on the graphs of grouped alerts discussed above. The most-connected configuration item of a graph (in terms of having the most incoming and/or the least outgoing links) is referred to the "topology origin" of the group, as this configuration item is estimated to be the most impactful. There can be more than one topology origin per group.

Then, records may be sorted according to a priority. For example, the sorted order may be: (i) changes on configuration items that are a topology origin, (ii) changes on configuration items that are not a topology origin, (iii) changes on related configuration items that are a topology origin, (iv) changes on related configuration items that are not a topology origin, and (v) alerts on configuration items that are a topology origin. The scoring reflects this prioritization by taking into consideration the type of record (e.g., change or alert), the type of configuration item, and the type of related configuration item.

Pane 1014 includes four buttons facilitating further actions. Actuating button 1016 switches to a user interface that allows the user to create an incident report, for example, based on one or more of the probable root causes. Actuating button 1018 switches to a user interface that allows the user to visualize the graph of configuration items related to Alert0020561 (e.g., similar to the depiction of service 600 in FIG. 6). Actuating button 1020 switches to a user interface that allows the user to view dependencies (e.g., in a tree-like format) between the configuration items identified in relation to Alert0020561. Actuating button 1022 switches to a user interface that allows the user to conduct a search (e.g., for further related configuration items, alert records, change request records, etc.).

These embodiments have the benefit of providing the user with a list of likely root causes of a problem. Rather than being based on subjective judgment or guesswork, the list is populated by change request records and/or alert records that have at least some relation to the configuration items likely to be involve in the problem. From this list, the user can likely determine the actual root cause more rapidly, which in turn reduces the MTTR of problems on the managed network.

VI. EXAMPLE OPERATIONS

Figure 11:
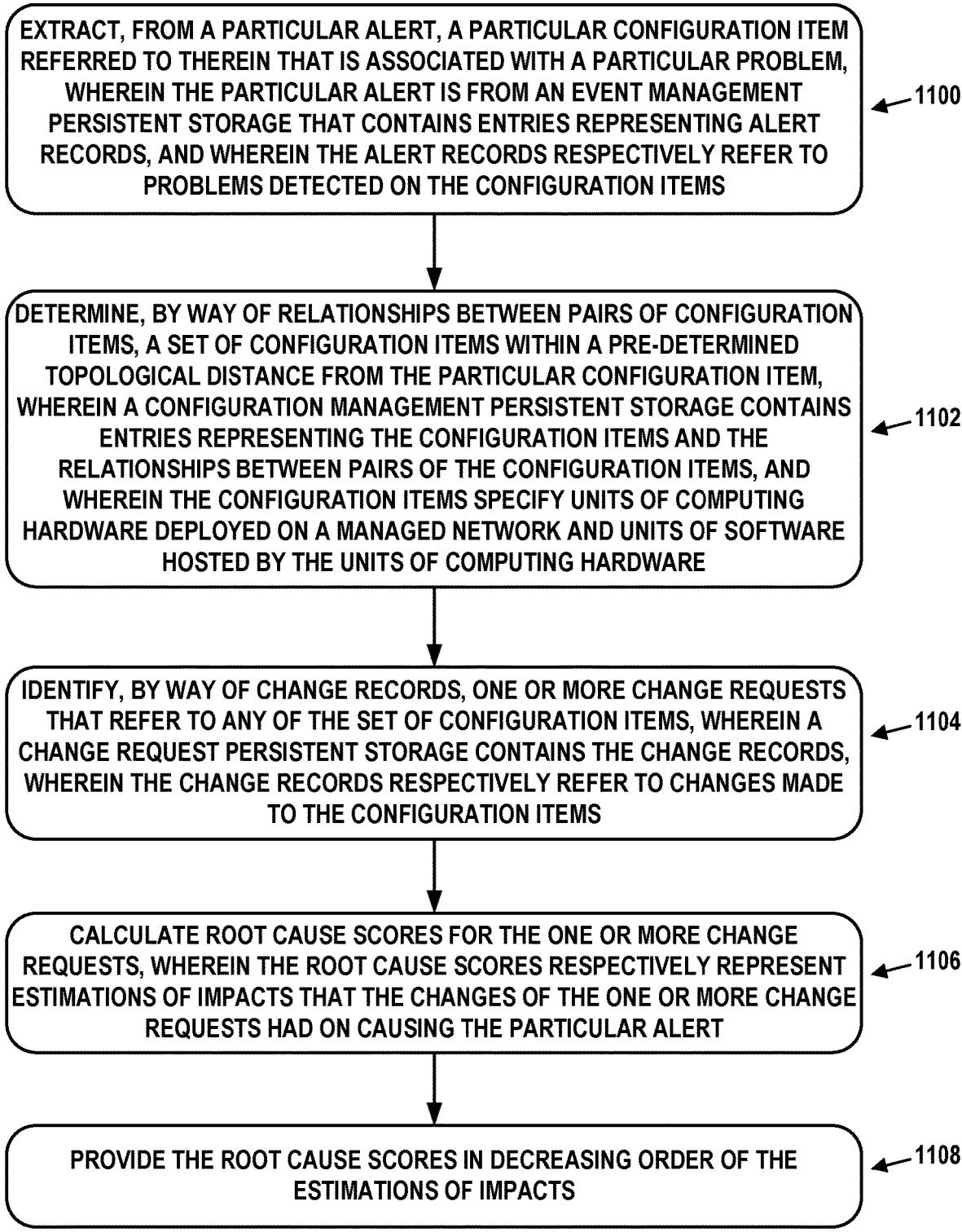
FIG. 11 is a flow chart, in accordance with example embodiments.

FIG. 11 is a flow chart illustrating an example embodiment. The process illustrated by FIG. 11 may be carried out by a computing device, such as computing device 100, and/or a cluster of computing devices, such as server cluster 200. However, the process can be carried out by other types of devices or device subsystems. For example, the process could be carried out by a computational instance of a remote network management platform.

The embodiments of FIG. 11 may be simplified by the removal of any one or more of the features shown therein. Further, these embodiments may be combined with features, aspects, and/or implementations of any of the previous figures or otherwise described herein.

Block 1100 may involve extracting, from a particular alert, a particular configuration item referred to therein that is associated with a particular problem, wherein the particular alert is from an event management persistent storage that contains entries representing alert records, and wherein the alert records respectively refer to problems detected on the configuration items.

Block 1102 may involve determining, by way of relationships between pairs of configuration items, a set of configuration items within a pre-determined topological distance from the particular configuration item, wherein a configuration management persistent storage contains entries representing the configuration items and the relationships between pairs of the configuration items, and wherein the configuration items specify units of computing hardware deployed on a managed network and units of software hosted by the units of computing hardware.

Block 1104 may involve identifying, by way of change records, one or more change requests that refer to any of the set of configuration items, wherein a change request persistent storage contains the change records, wherein the change records respectively refer to changes made to the configuration items.

Block 1106 may involve calculating root cause scores for the one or more change requests, wherein the root cause scores respectively represent estimations of impacts that the changes of the one or more change requests had on causing the particular alert.

Block 1108 may involve providing the root cause scores in decreasing order of the estimations of impacts.

In some embodiments, the configuration management persistent storage, the event management persistent storage, and the change request persistent storage are implemented in separate databases.

In some embodiments, the configuration management persistent storage, the event management persistent storage, and the change request persistent storage are implemented using different sets of tables within a common database.

In some embodiments, the system is part of a remote network management platform that is physically distinct from the managed network.

In some embodiments, the alert records were generated by one or more of the configuration items.

In some embodiments, the alert records are respectively associated with creation times, and the change records that have been completed are respectively associated with completion times, wherein identifying the one or more change requests comprises determining that the one or more change requests have completion times within a predefined threshold duration before a particular creation time of the particular alert.

In some embodiments, the alert records are respectively associated with creation times, and the change records that have been completed are respectively associated with completion times, wherein the root cause scores are based on differences between the completion times of the change requests and a particular creation time of the particular alert.

In some embodiments, the root cause scores are based on respective topological distances between the particular configuration item and the set of configuration items.

In some embodiments, the pre-determined topological distance is one hop or two hops.

Some embodiments may involve identifying, by way of the alert records, one or more alerts that refer to any of the set of configuration items, wherein the root cause scores also respectively represent estimations of relevance that the one or more alerts have to the particular alert, and wherein the root cause scores are provided in decreasing order of the estimations of impacts and the estimations of relevance.

Some embodiments may involve an incident persistent storage containing entries representing incident reports, wherein the incident reports respectively refer to configuration items suspected of being related to incidents observed in the managed network. These embodiments may further involve: (i) identifying, by way of the incident reports, one or more incident reports that refer to any of the set of configuration items; and (ii) calculating the root cause scores also for the one or more incident reports, wherein the root cause scores respectively represent estimations of relevance that the incidents of the one or more incident reports have to the particular alert.

VII. CLOSING

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer readable medium such as a storage device including RAM, a disk drive, a solid state drive, or another storage medium.

The computer readable medium can also include non-transitory computer readable media such as computer readable media that store data for short periods of time like register memory and processor cache. The computer readable media can further include non-transitory computer readable media that store program code and/or data for longer periods of time. Thus, the computer readable media may include secondary or persistent long term storage, like ROM, optical or magnetic disks, solid state drives, or compact-disc read only memory (CD-ROM), for example. The computer readable media can also be any other volatile or non-volatile storage systems. A computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A system comprising:
   configuration management persistent storage containing entries representing configuration items and relationships between pairs of the configuration items, wherein the configuration items specify units of computing hardware deployed on a managed network and units of software hosted by the units of computing hardware;
   event management persistent storage containing entries representing alert records, wherein the alert records respectively refer to problems detected on the configuration items;
   change request persistent storage containing change records, wherein the change records respectively refer to changes made to the configuration items; and
   one or more processors configured to:
      extract, from a particular alert of the alert records, a particular configuration item referred to therein that is associated with a particular problem;
      determine, by way of the relationships, a set of configuration items within a pre-determined topological distance from the particular configuration item, wherein the pre-determined topological distance is based on a number of hops from a unit of computing hardware or software represented by the particular configuration item;
      identify, by way of the change records, one or more change requests that refer to any of the set of configuration items;
      calculate root cause scores for the one or more change requests, wherein the root cause scores respectively represent estimations of impacts that the changes of the one or more change requests had on causing the particular alert; and
      provide the root cause scores in decreasing order of the estimations of impacts.

2. The system of claim 1, wherein the configuration management persistent storage, the event management persistent storage, and the change request persistent storage are implemented in separate databases.

3. The system of claim 1, wherein the configuration management persistent storage, the event management persistent storage, and the change request persistent storage are implemented using different sets of tables within a common database.

4. The system of claim 1, wherein the system is part of a remote network management platform that is physically distinct from the managed network.

5. The system of claim 1, wherein the alert records were generated by one or more of the configuration items.

6. The system of claim 1, wherein the alert records are respectively associated with creation times, wherein the change records that have been completed are respectively associated with completion times, and wherein identifying the one or more change requests comprises determining that the one or more change requests have completion times within a predefined threshold duration before a particular creation time of the particular alert.

7. The system of claim 1, wherein the alert records are respectively associated with creation times, wherein the change records that have been completed are respectively associated with completion times, and wherein the root cause scores are based on differences between the completion times of the change requests and a particular creation time of the particular alert.

8. The system of claim 1, wherein the root cause scores are based on respective topological distances between the particular configuration item and the set of configuration items.

9. The system of claim 1, wherein the pre-determined topological distance is one hop or two hops.

10. The system of claim 1, wherein the one or more processors are further configured to:
   identify, by way of the alert records, one or more alerts that refer to any of the set of configuration items, wherein the root cause scores also respectively represent estimations of relevance that the one or more alerts have to the particular alert, and wherein the root cause scores are provided in decreasing order of the estimations of impacts and the estimations of relevance.

11. The system of claim 1, further comprising:
   an incident persistent storage containing entries representing incident reports, wherein the incident reports respectively refer to configuration items suspected of being related to incidents observed in the managed network, wherein the one or more processors are further configured to:
   identify, by way of the incident reports, one or more incident reports that refer to any of the set of configuration items; and
   calculate the root cause scores also for the one or more incident reports, wherein the root cause scores respectively represent estimations of relevance that the incidents of the one or more incident reports have to the particular alert.

12. A computer-implemented method comprising:
   extracting, from a particular alert, a particular configuration item referred to therein that is associated with a particular problem, wherein the particular alert is from an event management persistent storage that contains entries representing alert records, and wherein the alert records respectively refer to problems detected on the configuration items;
   determining, by way of relationships between pairs of configuration items, a set of configuration items within a pre-determined topological distance from the particular configuration item, wherein a configuration management persistent storage contains entries representing the configuration items and the relationships between pairs of the configuration items, wherein the configuration items specify units of computing hardware deployed on a managed network and units of software hosted by the units of computing hardware, and wherein the pre-determined topological distance is based on a number of hops from a unit of computing hardware or software represented by the particular configuration item;

identifying, by way of change records, one or more change requests that refer to any of the set of configuration items, wherein a change request persistent storage contains the change records, wherein the change records respectively refer to changes made to the configuration items;

calculating root cause scores for the one or more change requests, wherein the root cause scores respectively represent estimations of impacts that the changes of the one or more change requests had on causing the particular alert; and providing the root cause scores in decreasing order of the estimations of impacts.

13. The computer-implemented method of claim 12, wherein the alert records are respectively associated with creation times, wherein the change records that have been completed are respectively associated with completion times, and wherein identifying the one or more change requests comprises determining that the one or more change requests have completion times within a predefined threshold duration before a particular creation time of the particular alert.

14. The computer-implemented method of claim 12, wherein the alert records were generated by one or more of the configuration items.

15. The computer-implemented method of claim 12, wherein the alert records are respectively associated with creation times, wherein the change records that have been completed are respectively associated with completion times, and wherein the root cause scores are based on differences between the completion times of the change requests and a particular creation time of the particular alert.

16. The computer-implemented method of claim 12, wherein the root cause scores are based on respective topological distances between the particular configuration item and the set of configuration items.

17. The computer-implemented method of claim 12, wherein the pre-determined topological distance is one hop or two hops.

18. The computer-implemented method of claim 12, further comprising:
identifying, by way of the alert records, one or more alerts that refer to any of the set of configuration items, wherein the root cause scores also respectively represent estimations of relevance that the one or more alerts have to the particular alert, and wherein the root cause scores are provided in decreasing order of the estimations of impacts and the estimations of relevance.

19. The computer-implemented method of claim 12, further comprising:
identifying, by way of incident reports, one or more incident reports that refer to any of the set of configuration items, wherein an incident persistent storage contains entries representing incident reports, and wherein the incident reports respectively refer to configuration items suspected of being related to incidents observed in the managed network; and calculating the root cause scores also for the one or more incident reports, wherein the root cause scores respectively represent estimations of relevance that the incidents of the one or more incident reports have to the particular alert.

20. An article of manufacture including a non-transitory computer-readable medium, having stored thereon program instructions that, upon execution by a computing system, cause the computing system to perform operations comprising:

extracting, from a particular alert, a particular configuration item referred to therein that is associated with a particular problem, wherein the particular alert is from an event management persistent storage that contains entries representing alert records, and wherein the alert records respectively refer to problems detected on the configuration items;

determining, by way of relationships between pairs of configuration items, a set of configuration items within a pre-determined topological distance from the particular configuration item, wherein a configuration management persistent storage contains entries representing the configuration items and the relationships between pairs of the configuration items, wherein the configuration items specify units of computing hardware deployed on a managed network and units of software hosted by the units of computing hardware, and wherein the pre-determined topological distance is based on a number of hops from a unit of computing hardware or software represented by the particular configuration item;

identifying, by way of change records, one or more change requests that refer to any of the set of configuration items, wherein a change request persistent storage contains the change records, wherein the change records respectively refer to changes made to the configuration items;

calculating root cause scores for the one or more change requests, wherein the root cause scores respectively represent estimations of impacts that the changes of the one or more change requests had on causing the particular alert; and providing the root cause scores in decreasing order of the estimations of impacts.

* * * * *